(12) United States Patent  
Horiguchi

(10) Patent No.: US 9,782,842 B2
(45) Date of Patent: Oct. 10, 2017

(54) METHOD OF MANUFACTURING AN ELBOW, CUTTING TOOL, AND ELBOW

(71) Applicant: Noda Kanagata Co., Ltd., Takaishi-shi, Osaka (JP)

(72) Inventor: Nobuo Horiguchi, Takaishi (JP)

(73) Assignee: NODA KANAGATA CO., LTD., Takaishi-shi, Osaka (JP)

( * ) Notice: Subject to any disclaimer, the term of this patent is extended or adjusted under 35 U.S.C. 154(b) by 0 days.

(21) Appl. No.: 14/417,746

(22) PCT Filed: Dec. 27, 2013

(86) PCT No.: PCT/JP2013/085271
§ 371 (c)(1),
(2) Date: Jan. 27, 2015

(87) PCT Pub. No.: WO2015/015668
PCT Pub. Date: Feb. 5, 2015

(65) Prior Publication Data
US 2015/0375311 A1   Dec. 31, 2015

(30) Foreign Application Priority Data

Jul. 31, 2013   (JP) .................................. 2013-159912

(51) Int. Cl.
*B23C 5/14* (2006.01)
*B23C 5/10* (2006.01)
(Continued)

(52) U.S. Cl.
CPC .............. *B23C 5/1027* (2013.01); *B23C 3/16* (2013.01); *B23B 5/365* (2013.01);
(Continued)

(58) Field of Classification Search
CPC . Y10T 409/303752; Y10T 409/303808; Y10T 409/304424; Y10T 409/304368;
(Continued)

(56) References Cited

U.S. PATENT DOCUMENTS

| | | | | |
|---|---|---|---|---|
| 1,913,490 A | * | 6/1933 | Kepler | .................. B21C 37/283 |
| | | | | 285/134.1 |
| 2,352,753 A | * | 7/1944 | Anderson | ............... B24B 19/02 |
| | | | | 409/199 |

(Continued)

FOREIGN PATENT DOCUMENTS

| | | | | |
|---|---|---|---|---|
| CA | 2805935 A1 | * | 1/2012 | ............... B23C 3/16 |
| CN | 101690979 A | | 4/2010 | |

(Continued)

OTHER PUBLICATIONS

English Translation of DE 19502342 A1.*
(Continued)

*Primary Examiner* — Daniel Howell
*Assistant Examiner* — Yasir Diab
(74) *Attorney, Agent, or Firm* — Procopio, Cory, Hargreaves & Savitch LLP

(57) ABSTRACT

Provided is a method of manufacturing an elbow, including: a first cutting step of cutting a material by relatively moving a cutting section of a cutting tool, which is formed of at least a part of a substantially spherical shape, along an inner side surface of the elbow to be finished in a direction from a first end surface to a second end surface of the material; and a second cutting step of cutting the material by relatively moving the cutting section along the inner side surface of the elbow to be finished in a direction from the second end surface to the first end surface of the material.

8 Claims, 24 Drawing Sheets

(51) Int. Cl.
*B23C 3/16* (2006.01)
*B23B 5/36* (2006.01)

(52) U.S. Cl.
CPC ...... *B23C 2220/04* (2013.01); *B23C 2220/68* (2013.01); *Y10T 409/303752* (2015.01); *Y10T 409/304368* (2015.01); *Y10T 409/304424* (2015.01)

(58) Field of Classification Search
CPC .. B23B 5/365; B23C 3/16; B23C 3/02; B23C 3/04; B23C 2220/68; B23C 2270/18; B23C 2270/20
USPC ....... 409/131, 132, 142, 143, 159, 165, 168, 409/172
See application file for complete search history.

(56) References Cited

U.S. PATENT DOCUMENTS

| | | | | |
|---|---|---|---|---|
| 3,159,952 | A * | 12/1964 | Lipkins | B24D 7/005 451/541 |
| 3,709,624 | A | 1/1973 | Blank | |
| 4,753,558 | A * | 6/1988 | Jansson | B27G 15/00 144/219 |
| 5,190,419 | A | 3/1993 | Lindberg et al. | |
| 5,238,337 | A * | 8/1993 | Nussbaumer | B23D 21/04 409/132 |
| 2004/0093727 | A1* | 5/2004 | Mola | B23C 3/18 29/888.024 |
| 2005/0177138 | A1 | 8/2005 | Dubrovsky | |
| 2012/0070238 | A1 | 3/2012 | Men | |
| 2013/0000121 | A1* | 1/2013 | Burgess | B23C 3/18 29/889.23 |
| 2013/0099477 | A1 | 4/2013 | Horiguchi | |
| 2014/0349250 | A1* | 11/2014 | Elsner | A61C 8/005 433/174 |
| 2015/0285422 | A1 | 10/2015 | Horiguchi | |

FOREIGN PATENT DOCUMENTS

| | | | | |
|---|---|---|---|---|
| CN | 101767214 | A | 7/2010 | |
| CN | 201664771 | U | 12/2010 | |
| CN | 102166665 | A | 8/2011 | |
| CN | 103038010 | A | 4/2013 | |
| CN | 203031019 | U | 7/2013 | |
| DE | 19502342 | | 8/1995 | |
| EP | 0464954 | | 12/1991 | |
| EP | 0881020 | | 12/1998 | |
| GB | 2079656 | A * | 1/1982 | .......... B23B 51/048 |
| GB | 2082102 | A | 3/1982 | |
| HU | WO 2013050796 | A1 * | 4/2013 | ............ A61C 8/005 |
| JP | 57-54018 | A | 3/1982 | |
| JP | 62271616 | A * | 11/1987 | |
| JP | S62-271616 | | 11/1987 | |
| JP | 64-32113 | U | 2/1989 | |
| JP | 01-289611 | A | 11/1989 | |
| JP | 07-124812 | A | 5/1995 | |
| JP | 2000-326134 | A | 11/2000 | |
| JP | 2004-09158 | A | 1/2004 | |
| JP | 2008-49450 | A | 3/2008 | |
| JP | 2010-137351 | A | 6/2010 | |
| JP | 4491538 | B | 6/2010 | |
| JP | 2013-043255 | A | 3/2013 | |
| WO | 2012-001761 | A | 1/2012 | |
| WO | 2015/015668 | | 2/2015 | |

OTHER PUBLICATIONS

Office Action dated Feb. 10, 2015, issued for Japanese Application No. 2014-194276.
International Search Report and Written Opinion dated Apr. 1, 2014, issued for International Application No. PCT/JP2013/085271.
Translation of OA for CN App. No. 20141001002840.X dated Oct. 20, 2015.
Extended European Search Report for EP App No. 13890456.0 dated Jun. 20, 2016, 7 pgs.

* cited by examiner

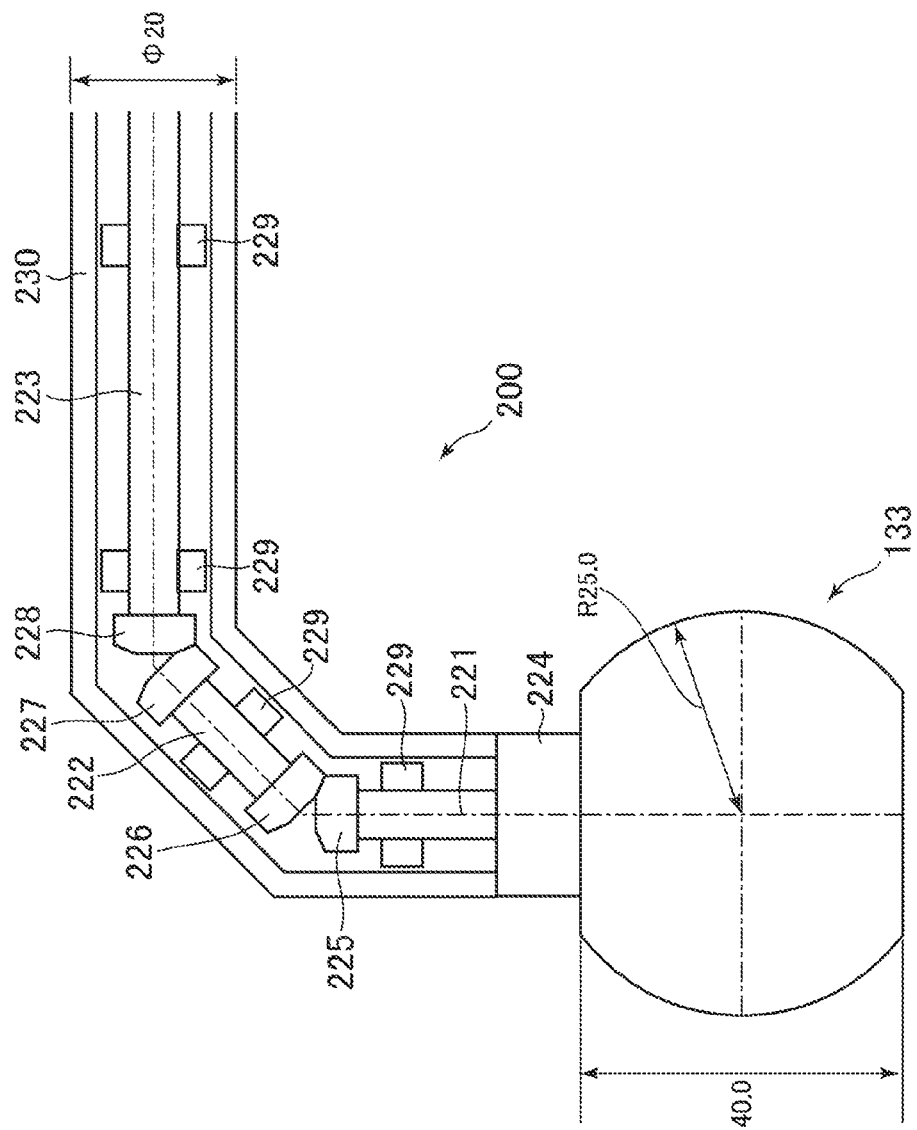

METHOD OF MANUFACTURING AN ELBOW, CUTTING TOOL, AND ELBOW

TECHNICAL FIELD

The present invention relates to a method of manufacturing an elbow, a cutting tool, and an elbow.

BACKGROUND ART

For example, a so-called machined elbow formed by machining a material is known. However, even when a so-called 5-axis machining device or the like capable of performing processing at a higher level is used during a manufacturing process of the machined elbow, unmachined portions remain on an inner side surface of a target elbow in some cases. In order to solve the above-mentioned problem, for example, Patent Literature 1 discloses a method of manufacturing a machined elbow without unmachined portions by roughly processing a material to form a starting hole, revolving a side cutter, which has cutting edges having an arc in shape on an outer circumference thereof, along an inner side surface of a target elbow, and moving the side cutter in a spiral shape for cutting.

CITATION LIST

Patent Literature

[Patent Literature 1] JP 4491538 B1

SUMMARY OF INVENTION

Technical Problem

However, for example, in Patent Literature 1, the inner side surface of the target elbow is formed by moving the side cutter in a spiral shape for cutting, and hence it takes time for the processing.

In view of the above-mentioned problem, it is an object of the present invention to provide a method of manufacturing an elbow with higher speed and higher accuracy without causing uncut portions, and to provide an elbow and a cutting tool to be used for manufacturing the elbow.

Solution to Problem (1) According to one embodiment of the present invention, there is provided a method of manufacturing an elbow, including: a cutting step of cutting a roughly formed elbow to form an inner side surface of the elbow to be finished by relatively moving a cutting section included in a cutting tool, which is formed of at least a part of a substantially spherical shape, along a center line of the elbow to be finished in a direction from a first end surface to a second end surface of the roughly formed elbow; and a moving step of relatively moving the cutting section along the center line of the elbow to be finished in a direction from the second end surface to the first end surface of the roughly formed elbow, the cutting section having a diameter substantially equal to an inner diameter of the elbow to be finished.

(2) In the method of manufacturing an elbow as described in Item (1), a bending angle of the elbow to be finished is substantially 90°.

(3) In the method of manufacturing an elbow as described in Item (2), the cutting step includes causing the cutting section to start intruding into the first end surface at an angle of substantially 20° with respect to a direction along a shaft section extending from the cutting section.

(4) The method of manufacturing an elbow as described in Item (1) further includes a step of fixing the roughly formed elbow to a table, and the cutting step and the moving step are carried out by rotating the table.

(5) In the method of manufacturing an elbow as described in Item (2), the cutting tool includes a shaft section extending from the cutting section, and a diameter of the shaft section is one-fifth to two-fifths as large as a diameter of the substantially spherical shape.

(6) In the method of manufacturing an elbow as described in Item (1), the cutting tool includes a shaft section extending from the cutting section, and the cutting section includes a plurality of cutting edges arranged while being shifted from each other with respect to a direction along the shaft section.

(7) The method of manufacturing an elbow as described in Item (1) further includes an outer side surface formation step of forming an outer side surface of the elbow to be finished by carrying out cutting along an outer circumference of an outer side surface of the roughly formed elbow by relatively rotating a processing tip, and moving the roughly formed elbow in the direction from the first end surface to the second end surface.

(8) The method of manufacturing an elbow as described in Item (7) further includes a step of fixing the roughly formed elbow to a rotary table, and the moving the roughly formed elbow in the outer side surface formation step includes rotating the rotary table.

(9) According to one embodiment of the present invention, there is provided a cutting tool, including: a cutting section formed of at least a part of a substantially spherical shape, the cutting section including a plurality of cutting edges; and a shaft section extending from the cutting section.

(10) In the cutting tool as described in Item (9), the cutting section includes a plurality of ridge portions each formed into a ridge shape along a surface of the cutting section so as to extend from one end of the cutting section, the plurality of ridge portions each including the plurality of cutting edges on a side surface thereof.

(11) In the cutting tool as described in Item (9), a diameter of the shaft section is one-fifth to two-fifths as large as a diameter of the substantially spherical shape.

(12) In the cutting tool as described in Item (9), the cutting section has a shape obtained by cutting away portions positioned on the shaft section and on an opposite side to the shaft section from the substantially spherical shape.

(13) In the cutting tool as described in Item (12), the cutting section further has a shape obtained by cutting away in a direction substantially perpendicular to the shaft section.

(14) The cutting tool as described in Item (9) further includes: a first bevel gear connected to the shaft section; and a first shaft portion including a second bevel gear engaged with the first bevel gear at one end of the first shaft portion, and the shaft section and the first shaft portion have a predetermined angle.

(15) In the cutting tool as described in Item (14), the first shaft portion includes a third bevel gear at another end of the first shaft portion, the cutting tool further includes a second shaft portion including a fourth bevel gear engaged with the third bevel gear, and the first shaft portion and the second shaft portion have a predetermined angle.

(16) In the cutting tool as described in Item (14), the predetermined angle is substantially 45°.

(17) In the cutting tool as described in Item (10), cutting edges of a plurality of adjacent ridge portions among the plurality of ridge portions are arranged while being shifted from each other with respect to a rotational direction.

(18) In the cutting tool as described in Item (10), each of the plurality of ridge portions includes a plurality of accommodating portions configured to accommodate the plurality of cutting edges in a freely removable manner, respectively.

(19) According to another embodiment of the present invention, there is provided a method of manufacturing an elbow, including: a first cutting step of cutting a material by relatively moving a cutting section of a cutting tool, which is formed of at least a part of a substantially spherical shape, along an inner side surface of the elbow to be finished in a direction from a first end surface to a second end surface of the material; and a second cutting step of cutting the material by relatively moving the cutting section along the inner side surface of the elbow to be finished in a direction from the second end surface to the first end surface of the material.

(20) In the method of manufacturing an elbow as described in Item (19), the first cutting step and the second cutting step are carried out while relatively moving the cutting tool with respect to the material so as to cut the material along a circumference of the inner side surface of the elbow of the first end surface.

(21) In the method of manufacturing an elbow as described in Item (20), the first cutting step and the second cutting step are carried out while relatively moving the cutting tool with respect to the material by moving a shaft of the cutting tool.

(22) In the method of manufacturing an elbow as described in Item (20), the first cutting step and the second cutting step are carried out while moving the cutting tool with respect to the material and further moving a table having the material fixed thereto.

(23) In the method of manufacturing an elbow as described in any one of Items (19) to (22), the first cutting step and the second cutting step are carried out from the first end surface side of the material, and then from the second end surface side of the material.

(24) In the method of manufacturing an elbow as described in any one of Items (19) to (23), a diameter of the substantially spherical shape is smaller than an inner diameter of the elbow to be finished.

(25) In the method of manufacturing an elbow as described in any one of Items (19) to (24), a diameter of the cutting section is one-half or more and three-quarters or less as large as an inner diameter of the elbow to be finished.

(26) In the method of manufacturing an elbow as described in any one of Items (19) to (25), a bending angle of the elbow is substantially 90°.

(27) In the method of manufacturing an elbow as described in any one of Items (19) to (26), a bending angle of the elbow is substantially 180°.

(28) In the method of manufacturing an elbow as described in Item (19), a diameter of the substantially spherical shape is equal to an inner diameter of the elbow to be finished.

(29) According to another embodiment of the present invention, there is provided an elbow, including: an inner side surface having an axial center bending inward at a predetermined curvature, the inner side surface having a circular shape in cross section; and an outer side surface formed along the inner side surface, the outer side surface having a diameter larger than a diameter of the inner side surface, in which the inner side surface has the same flatness in a surface on an inner side of the curvature, and in a surface on an outer side of the curvature.

(30) In the elbow as described in Item (29), the entire inner side surface has the same flatness.

(31) In the elbow as described in Item (29), the inner side surface is formed by cutting an inner side surface of a roughly formed elbow by relatively moving a cutting section included in a cutting tool, which is formed of at least a part of a substantially spherical shape having a diameter substantially equal to an inner diameter of the elbow, along a center line of the elbow in a direction from a first end surface to a second end surface of the roughly formed elbow.

(32) In the elbow as described in Item (29), the inner side surface is formed by cutting a material by relatively moving a cutting section of a cutting tool, which is formed of at least a part of a substantially spherical shape, along the inner side surface of the elbow in a direction from a first end surface to a second end surface of the material.

(33) In the elbow as described in Item (32), the inner side surface is formed by cutting the material by further relatively moving the cutting section in a direction from the second end surface to the first end surface of the material.

(34) According to another embodiment of the present invention, there is provided a method of manufacturing an elbow, including: a step of forming a starting hole at a substantially center portion of an inner side surface of the elbow to be finished; a first cutting step of cutting a material by relatively moving a side cutter in a direction along the inner side surface of the elbow to be finished, and in a direction from a first end surface to a second end surface of the material; and a second cutting step of cutting the material by relatively moving the side cutter in the direction along the inner side surface of the elbow to be finished, and in a direction from the second end surface to the first end surface of the material.

(35) In the method of manufacturing an elbow as described in Item (34), the first cutting step and the second cutting step are carried out while relatively moving the side cutter with respect to the material so as to cut the material along a circumference of the inner side surface, which is formed on the first end surface or the second end surface of the elbow to be finished.

BRIEF DESCRIPTION OF DRAWINGS

FIG. 20 is a view schematically illustrating a cutting tool in a fourth embodiment of the present invention.

DESCRIPTION OF EMBODIMENTS

Figure 1:
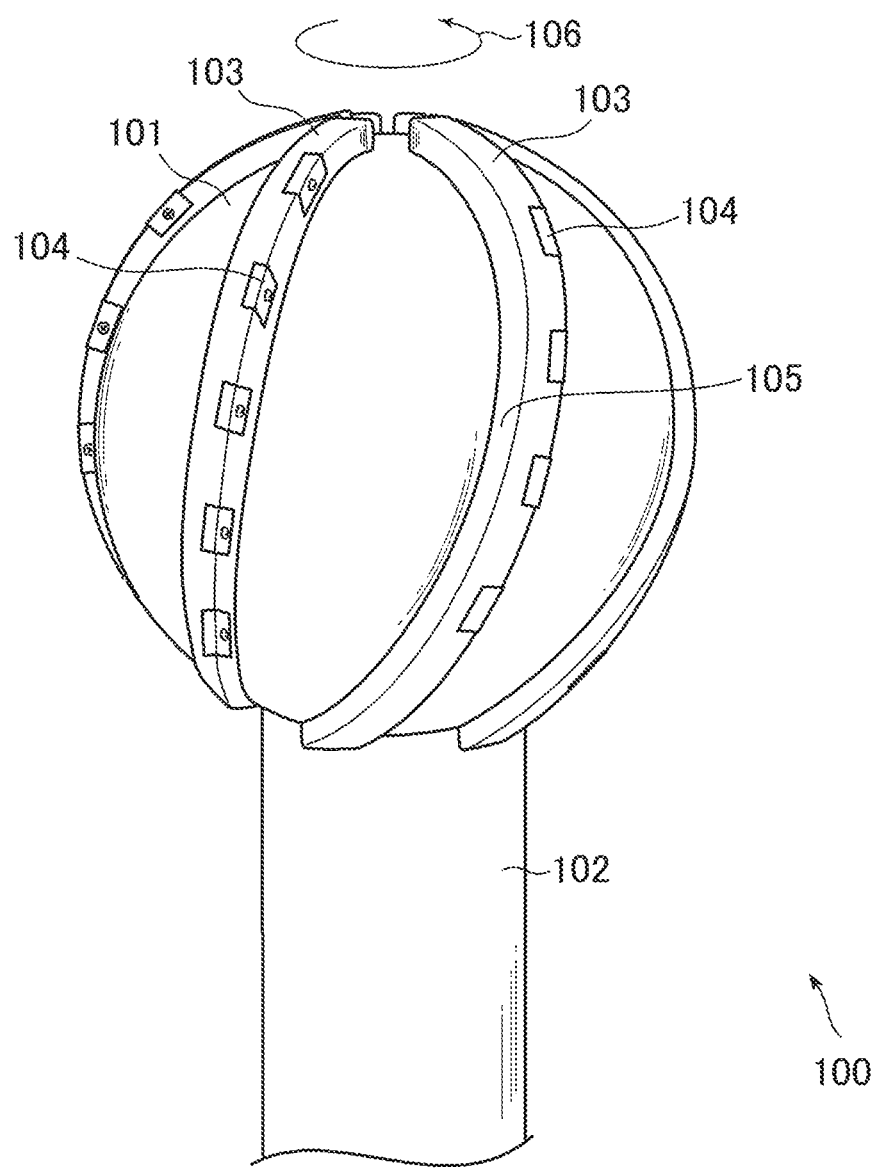
FIG. 1 is a view illustrating an example of a rotary cutting tool in a first embodiment of the present invention.

Referring to the accompanying drawings, embodiments of the present invention are described below. In the drawings, the same or similar components are denoted by the same reference symbols, and repetitive description thereof is omitted.

First Embodiment

First, an example of a rotary cutting tool to be used in a method of manufacturing an elbow in this embodiment is described. As illustrated in FIG. 1, a ball end mill 100 in this embodiment includes a substantially spherical cutting section 101 and a shaft section 102 formed so as to extend from the cutting section 101.

The substantially spherical cutting section 101 includes a plurality of ridge-shaped ridge portions 103 formed along the surface of the substantially spherical cutting section 101 so as to extend from one end of the cutting section 101. Specifically, for example, the plurality of ridge portions 103 are arranged so as to spread radially with an angle along the surface of the cutting section 101, when viewed from above in FIG. 1.

Further, a plurality of cutting edges 104 are arranged on a side surface of each ridge portion 103. Specifically, for example, the plurality of cutting edges 104 are arranged at a substantially equal interval on the side surface of each ridge portion 103. Further, each ridge portion 103 includes, for example, an accommodating portion 105 having a side surface on which the plurality of cutting edges 104 can be mounted in a freely removable manner, and the cutting edges 104 are mounted on the accommodating portion 105. Note that, for example, each cutting edge 104 is mounted on the accommodating portion 105, for example, through use of a bolt, a screw, or the like. Further, as a material for the cutting edge 104, for example, tungsten carbide is used.

Further, the cutting edges 104 of the adjacent ridges 103 are arranged while being shifted from each other with respect to a rotational direction 106. That is, for example, the two adjacent ridge portions 103 are arranged so that the position of the accommodating portion 105 of one ridge portion 103 (first ridge portion) is shifted from the position of the accommodating portion 105 of the other ridge portion 103 (second ridge portion) when viewed from a direction parallel to the shaft. Thus, although some parts of a material are not cut with the cutting edges 104 mounted on the first ridge portion 103 because the cutting edges 104 are arranged at a substantially equal interval on the first ridge portion 103, the uncut parts are cut with the cutting edges 104 mounted on the second ridge portion 103. Note that, it is desired that the size of the cutting section 101 including the plurality of ridge portions 103 and cutting edges 104 be one-half or more and three-quarters or less as large as an inner diameter of a target elbow.

The shaft section 102 is disposed so as to extend from the cutting section 101. In this case, the diameter of the shaft section 102 is smaller than that of the cutting section 101. Consequently, as described later, in the case where the ball end mill 100 is moved along an inner side surface of the target elbow, the interference between the shaft section 102 and the inner side surface of the elbow can be suppressed.

Note that, the ball end mill 100 illustrated in FIG. 1 is an example, and the diameter of the cutting section 101 and the diameter, length, and the like of the shaft section 102 are adjusted based on the bending angle and size of the target elbow, a machining device using the ball end mill 100, and the like. Further, needless to say, the number of ridge portions 103, the arc angle of the ridge portion 103 with respect to the spherical cutting section 101, and the like may be changed if needed.

Figure 2A:
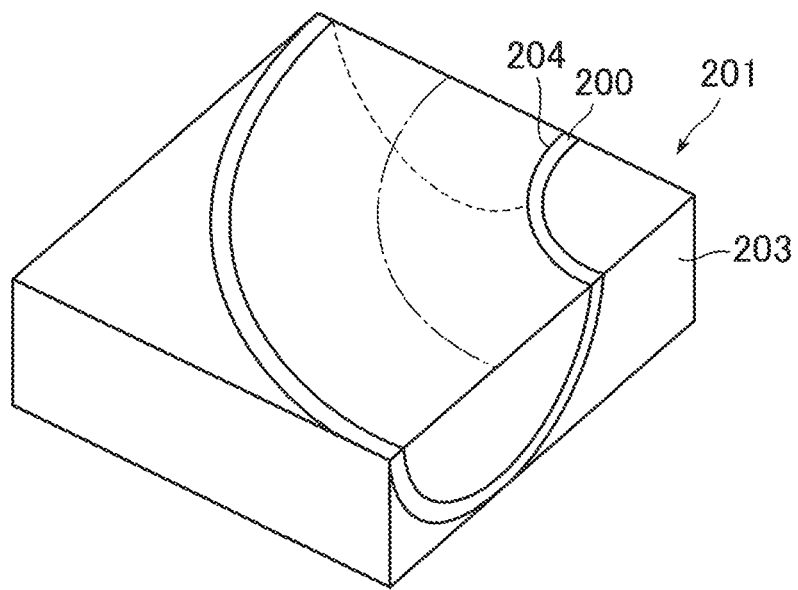
FIG. 2A is a view illustrating a material of an elbow in the first embodiment.
Figure 2B:
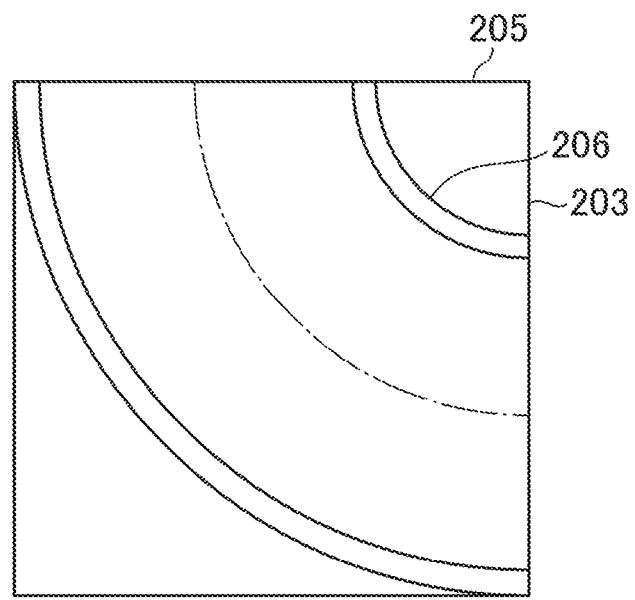
FIG. 2B is a view illustrating the material of the elbow in the first embodiment.

Next, a material of an elbow in this embodiment is described. In this case, a material 201 has a block shape, for example, as illustrated in FIGS. 2A and 2B. Note that, in FIGS. 2A and 2B, for ease of understanding, a cross section obtained by cutting the material 201 into halves is illustrated, a target elbow 200 is indicated by a solid line, and a center line of the elbow 200 is indicated by an alternate long and short dash line. Further, in FIGS. 2A and 2B, the material 201 of the elbow 200 having a bending angle of 90° is illustrated as an example. However, in the case of manufacturing the elbow 200 having other bending angles, the material 201 having a shape in accordance with the bending angle is used.

As is understood from FIGS. 2A and 2B, the target elbow 200 is manufactured by cutting a portion to be the target elbow 200 from the material 201. Further, as a material for the material 201, for example, a so-called low machinability material such as stainless steel, a titanium-based material, or a nickel-based heat-resistant alloy is used.

Figure 3A:
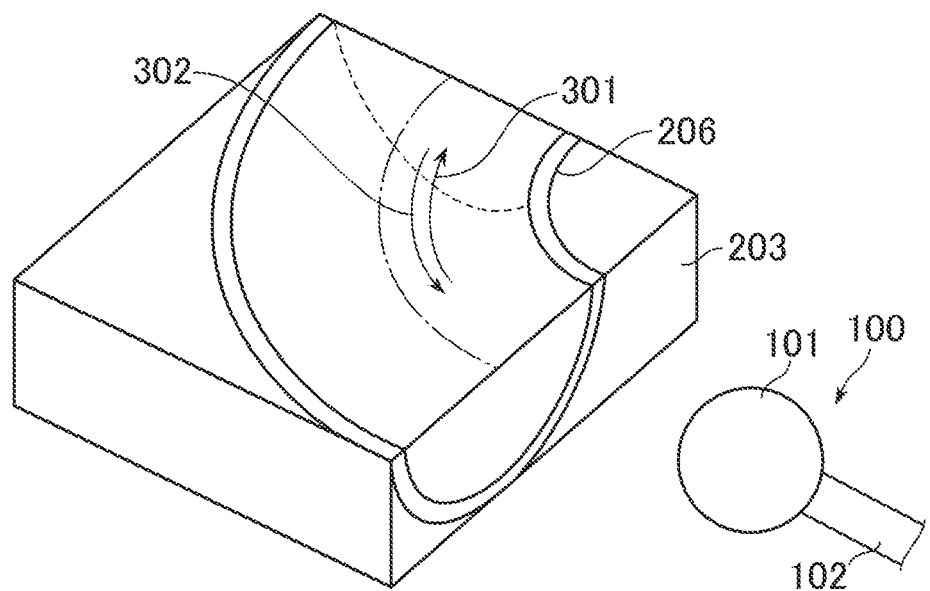
FIG. 3A is a view illustrating a method of manufacturing an elbow in the first embodiment.
Figure 3B:
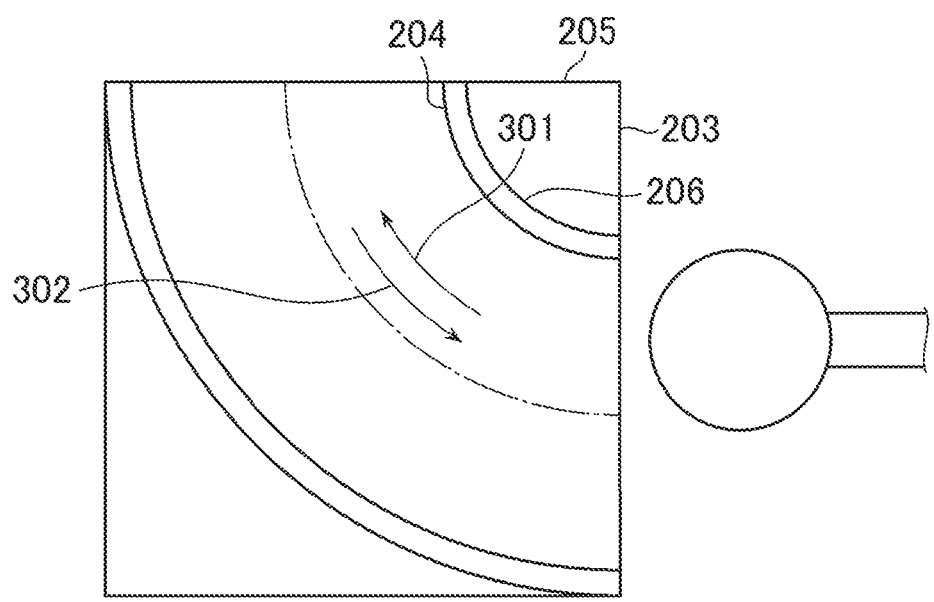
FIG. 3B is a view illustrating the method of manufacturing an elbow in the first embodiment.

Next, a method of manufacturing the elbow 200 is described. First, as illustrated in FIGS. 3A and 3B, the material 201 is set on a table (not shown) of a machining device. Then, the ball end mill 100 is set so that the shaft section 102 of the ball end mill 100 is substantially perpendicular to a first end surface 203 of the material 201. Note that, in FIGS. 3A and 3B, the ridge portions 103 illustrated in FIG. 1 are not shown.

Next, the material 201 is cut by relatively moving the cutting section 101 of the ball end mill 100 along an inner side surface 204 of the target elbow 200 in a direction from the first end surface 203 to a second end surface 205 of the material 201 (first cutting). Specifically, for example, in the case of FIG. 3A, the material 201 is cut by moving the cutting section in a direction of an arrow 301. In this case, the direction of the shaft section 102 of the ball end mill 100 with respect to the material 201 is adjusted so that the shaft section 102 does not interfere with the material 201.

In this case, the above-mentioned adjustment may be carried out, for example, so that the ball end mill 100 is moved through use of 3 axes, or the table may be moved through use of 2 axes in addition to the 3 axes. Note that, the 3 axes correspond to, for example, a three-dimension of x, y, and z axes, and the 2 axes correspond to, for example, a two-dimension of an x-axis and a y-axis.

Next, the material 201 is cut by relatively moving the cutting section of the ball end mill 100 along the inner side surface 204 of the target elbow 200 in a direction from the second end surface 205 to the first end surface 203 (second cutting). Specifically, for example, in the case of FIG. 3B, the material 201 is cut by moving the cutting section 101 in a direction of an arrow 302. In this case, in the same way as in the first cutting, the direction of the shaft section 102 of the ball end mill 100 with respect to the material 201 is adjusted so that the shaft section 102 does not interfere with the material 201. That is, the first cutting and the second cutting are carried out by reciprocating the cutting section 101 along the inner side surface 204 of the target elbow 200.

In this case, the first cutting and the second cutting are carried out while relatively moving the ball end mill 100 with respect to the material 201 so that the material 201 is cut along a circumference of the first end surface 203 or the second end surface 205 of the target elbow 200.

Figure 4:
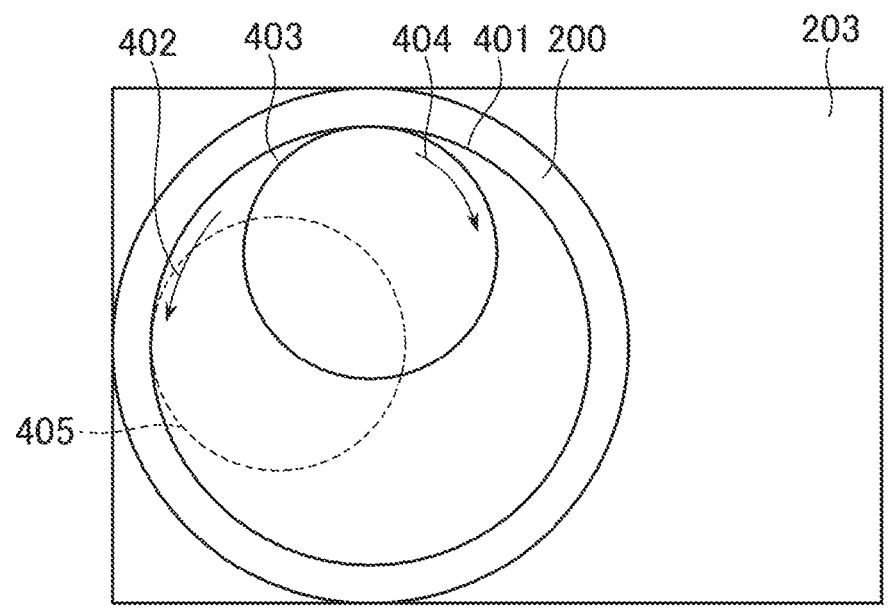
FIG. 4 is a view illustrating the method of manufacturing an elbow in the first embodiment.

Specifically, for example, as illustrated in FIG. 4, the first and second cuttings are carried out while relatively moving the ball end mill 100 in a direction 402 along a circumference 401 of the first end surface 203 represented by the inner side surface 204 of the target elbow 200. That is, in the first cutting, the ball end mill 100 moves in the direction 402 of the circumference 401, and hence a hole is formed diagonally with respect to a direction perpendicular to the first end surface 203 in the vicinity of the first end surface 203.

Further, in the second cutting, the ball end mill 100 moves in a direction of the circumference 401, and hence a hole is formed diagonally with respect to a direction perpendicular to the first end surface 203 in the vicinity of the first end surface 203. In other words, the first and second cuttings are carried out while revolving the ball end mill 100 in the circumferential direction 402. In this case, as illustrated in FIG. 4, it is preferred that an autorotating direction 404 of the cutting section 101 and the rotational direction 402 of the ball end mill 100 be opposite to each other.

Note that, in FIG. 4, for ease of understanding, an example of an intrusion position of the ball end mill 100 with respect to the material 201 in the first cutting is indicated by a solid line 403, and an example of the position at which the ball end mill 100 exits from the material 201 in the second cutting after the first cutting is indicated by a broken line 405.

The first and second cuttings are repeatedly carried out along the direction 402 of the circumference 401 from the first end surface 203 side until the inner side surface 204 of the target elbow 200 from the first end surface 203 side is formed.

Next, the ball end mill 100 is set so that the shaft section 102 of the ball end mill 100 is substantially perpendicular to the second end surface 205. Specifically, for example, the table is rotated so that the shaft section 102 of the ball end mill 100 is set so as to be substantially perpendicular to the second end surface 205. Next, in the same way as in the foregoing, the first cutting and the second cutting are repeatedly carried out while revolving the ball end mill 100 in the above-mentioned circumferential direction. Consequently, for example, uncut portions remaining on the second end surface 205 side caused by the interference between the shaft section 102 and the material 201 or the like during the cutting from the first end surface 203 side are cut, and the entire inner side surface 204 of the elbow 200 can be formed.

Next, an outer side surface 206 of the target elbow 200 is formed. Thus, the target elbow 200 is formed. The outer side surface 206 may be formed by the first cutting and the second cutting in the same way as in the foregoing, or may be formed through use of a milling cutter or a side cutter described later.

Further, in the foregoing, the case of revolving the ball end mill 100 in the circumferential direction 402 in both the first and second cuttings has been described. However, in the first or second cutting, the following configuration may be used: after the first cutting is carried out without moving the ball end mill 100 in the direction of the circumference 402, the ball end mill 100 is moved along the circumferential direction 402, and thereafter, the second cutting is carried out. Further, the ball end mill 100 may be moved in the circumferential direction 402 only in one of the first and second cuttings.

Figure 5A:
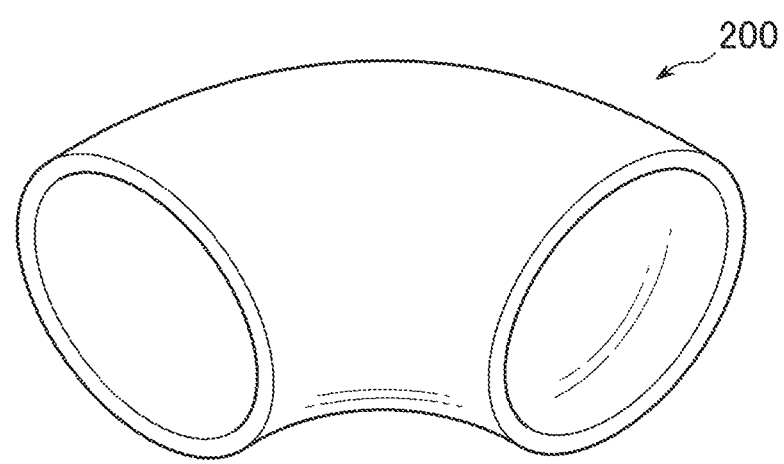
FIG. 5A is a view illustrating an example of the elbow in the first embodiment.
Figure 5B:
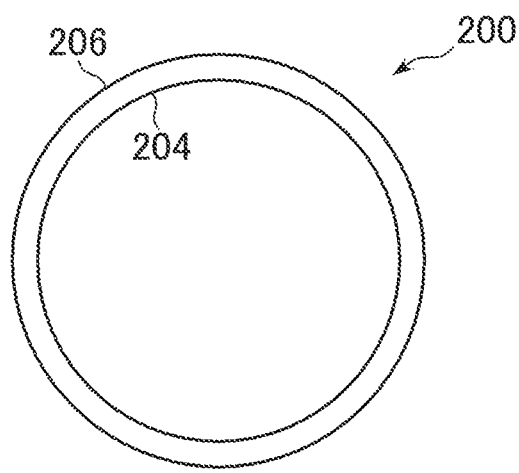
FIG. 5B is a view illustrating the example of the elbow in the first embodiment.
Figure 5C:
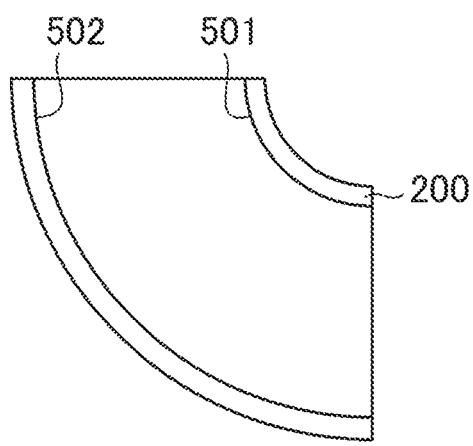
FIG. 5C is a view illustrating the example of the elbow in the first embodiment.

Next, an example of the elbow 200 in this embodiment is described. FIGS. 5A, 5B, and 5C are views each illustrating an example of the elbow 200 manufactured by the manufacturing method in this embodiment. Specifically, as an example, FIG. 5A is a perspective view of the elbow, FIG. 5B illustrates a cross section of the elbow illustrated in FIG. 5A, and FIG. 5C is a plan view of the elbow illustrated in FIG. 5A. Note that, for ease of description, FIG. 5C is a plan view in the case where the elbow 200 is cut into halves.

As illustrated in FIGS. 5A, 5B, and 5C, the elbow 200 includes the inner side surface 204 having an axial center bending at a predetermined curvature, the inner side surface 204 having a circular shape in cross section, and the outer side surface 206 having a predetermined distance from the inner side surface 204 to an outer side along the inner side surface 204. Further, the entire inner side surface 204 has substantially the same flatness so that the flatness in a surface 501 on an inner side of the curvature of the elbow 200 is not different from that in a surface 502 on an outer side of the curvature of the elbow 200.

Note that, although FIGS. 5A, 5B, and 5C illustrate, as an example, the elbow 200 which has a bending angle of 90°, has a circular shape in cross section, and has a predetermined tube thickness, the elbow 200 of this embodiment is not limited thereto, and for example, the elbow 200 may have a bending angle of 180° or may have a different tube thickness. Note that, according to this embodiment, the elbow 200 having a bending angle of up to about 200° can be manufactured.

According to this embodiment, a method of manufacturing an elbow with higher speed and higher accuracy without causing uncut portions, an elbow, and a ball end mill to be used for manufacturing the elbow can be provided.

For example, in the above-mentioned related art, the side cutter is moved in a spiral shape along the inner side surface of the target elbow so as to cut in a side surface direction of the cutter. However, according to this embodiment, the elbow 200 can be manufactured at higher speed by cutting through use of the ball end mill 100 along the inner side surface 204 of the elbow 200 directly along the target inner side surface 204. Further, the inner side surface 204 of the elbow 200 can be formed without forming a starting hole in the material 201, and hence time for forming a starting hole can also be omitted in the case where a starting hole is not formed.

Further, for example, in the above-mentioned related art, a pitch for spiral movement is varied when the inner side surface 204 of the target elbow is formed by moving the side cutter in a spiral shape, and hence the flatness is different between the inner side and the outer side of the inner side surface 204 with respect to the bending angle of the elbow 200. However, according to this embodiment, the flatness can be rendered substantially the same on the entire inner side surface 204 so that the flatness in the surface on the inner side of the curvature of the elbow 200 is not different from that in the surface on the outer side of the curvature of the elbow 200 by performing the first and second cuttings along the target inner side surface 204.

The present invention may be modified variously without being limited to the above-mentioned embodiment. For example, the above-mentioned embodiment may be replaced by a configuration which is substantially the same as that of the above-mentioned embodiment, a configuration having an action and effect which are substantially the same as those of the above-mentioned embodiment, or a configuration capable of achieving the same object as that of the above-mentioned embodiment.

For example, the case where the first and second cuttings are carried out from the second end surface 205 side has been described in the foregoing. However, in the case where no uncut portions are caused by cutting from the first end surface 203 side, that is, in the case where the entire inner side surface 204 of the elbow 200 can be formed, the first and second cuttings from the second end surface 205 side may be omitted. Specifically, in the case where a bending angle of the target elbow 200 is small, for example, in the case where the bending angle is 15°, the cutting from the second end surface 205 side may be omitted.

Further, the case where a starting hole is not formed has been described in the foregoing. However, the first cutting and the second cutting may be carried out after a starting hole is formed substantially at the center of the inner side surface 204 of the target elbow 200. The starting hole in this case may be formed, for example, through use of the ball end mill 100 or through use of a general milling cutter described later.

Further, the case of forming the outer side surface 206 after forming the inner side surface 204 has been described in the foregoing. However, the inner side surface 204 may be formed after the outer side surface 206 is formed. Further, the inner side surface 204 may be subjected to finish processing using a different cutting section 101 for finishing after the first cutting and the second cutting.

Second Embodiment

This embodiment is different from the first embodiment mainly in that the first cutting and the second cutting are carried out using a side cutter instead of the ball end mill 100. Note that, the descriptions similar to those of the first embodiment are omitted in the following.

Figure 6A:
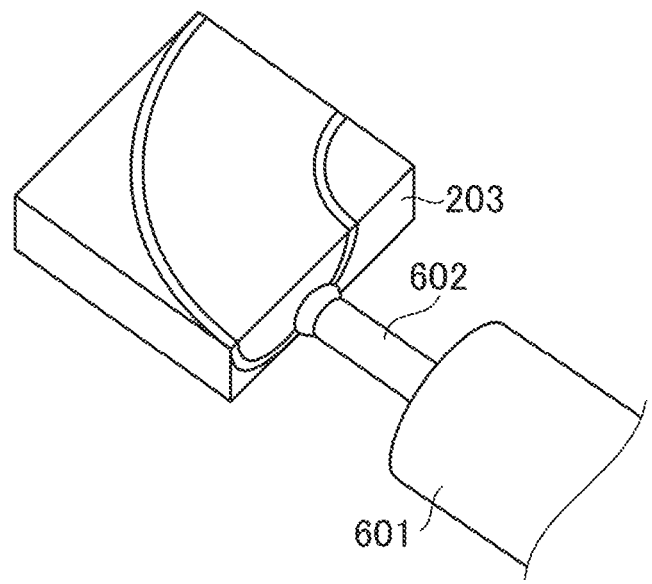
FIG. 6A is a view illustrating a method of manufacturing an elbow in a second embodiment of the present invention.

FIGS. 6A to 6D illustrate a method of manufacturing an elbow 200 in this embodiment. In this embodiment, as illustrated in FIG. 6A, first, a material 201 is set on a table of a machining device (not shown). Further, a milling cutter 601 is set so that a shaft section 602 of the milling cutter 601 is substantially perpendicular to a first end surface 203. In this case, for example, the milling cutter 601 is a face milling cutter which has a plurality of cutting edges having an arc in shape and is capable of cutting the material 201 in a direction perpendicular to the arc. The detailed configuration of the milling cutter 601 is well-known, and hence the description thereof is omitted.

Figure 6B:
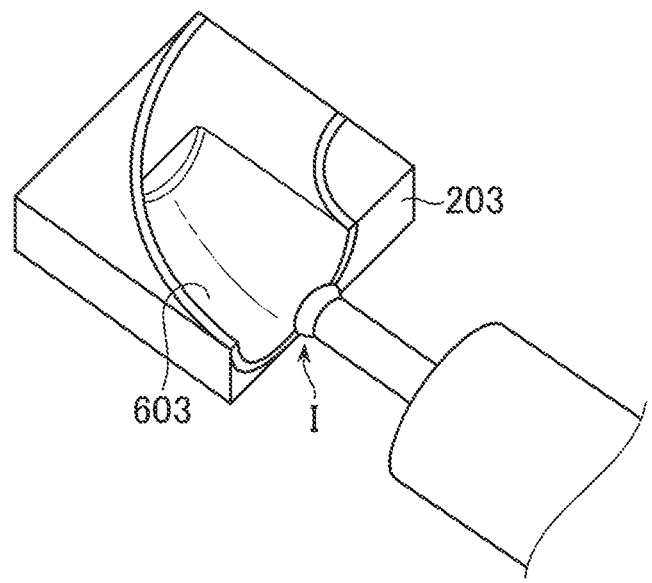
FIG. 6B is a view illustrating the method of manufacturing an elbow in the second embodiment.

Next, as illustrated in FIG. 6B, a starting hole 603 is formed from the first end surface 203 through use of the milling cutter 601. Specifically, the starting hole 603 is formed by moving the milling cutter 601 in an axial direction while changing the position of the milling cutter 601. The outer shape of the starting hole 603 is larger than the outer shape of a cutter cutting section of the side cutter having an arc in shape (described later) so that the cutter cutting section can be inserted in the starting hole 603. Note that, the shape and position of the starting hole 603 illustrated in FIG. 6B are merely an example, and different shapes and positions may be used as long as the cutter cutting section of the side cutter having an arc in shape can be inserted in the starting hole 603.

Figure 6C:
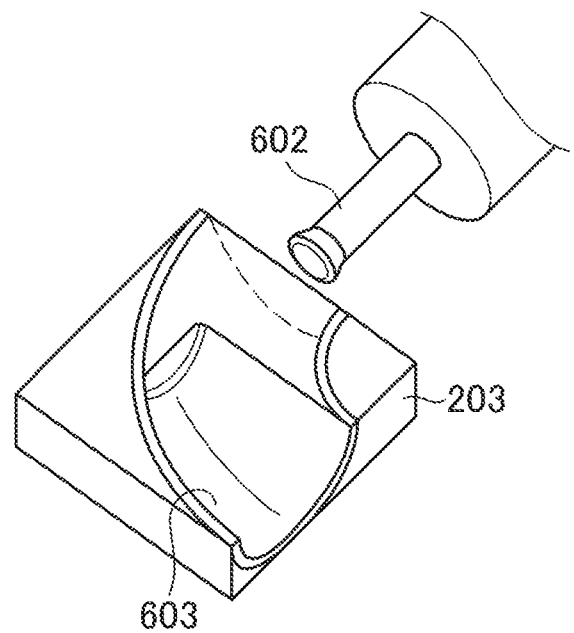
FIG. 6C is a view illustrating the method of manufacturing an elbow in the second embodiment.
Figure 6D:
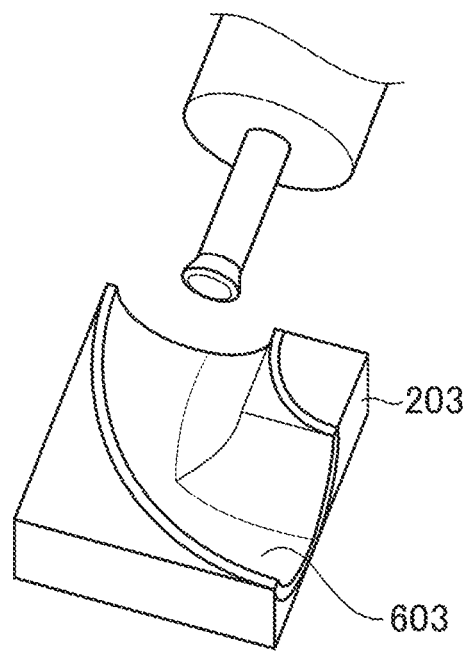
FIG. 6D is a view illustrating the method of manufacturing an elbow in the second embodiment.

Next, similarly, for example, as illustrated in FIG. 6C, the milling cutter 601 is set so that the shaft section 602 of the milling cutter 601 is substantially perpendicular to a second end surface 205, and the starting hole 603 is formed also from the second end surface 205 side as illustrated in FIG. 6D.

Next, in the same way as in the first embodiment, the material 201 is cut by relatively moving a cutting section 701 of a side cutter 700 along the inner side surface 204 of the target elbow 200 in a direction from the first end surface 203 to the second end surface 205 (first cutting).

Figure 7A:
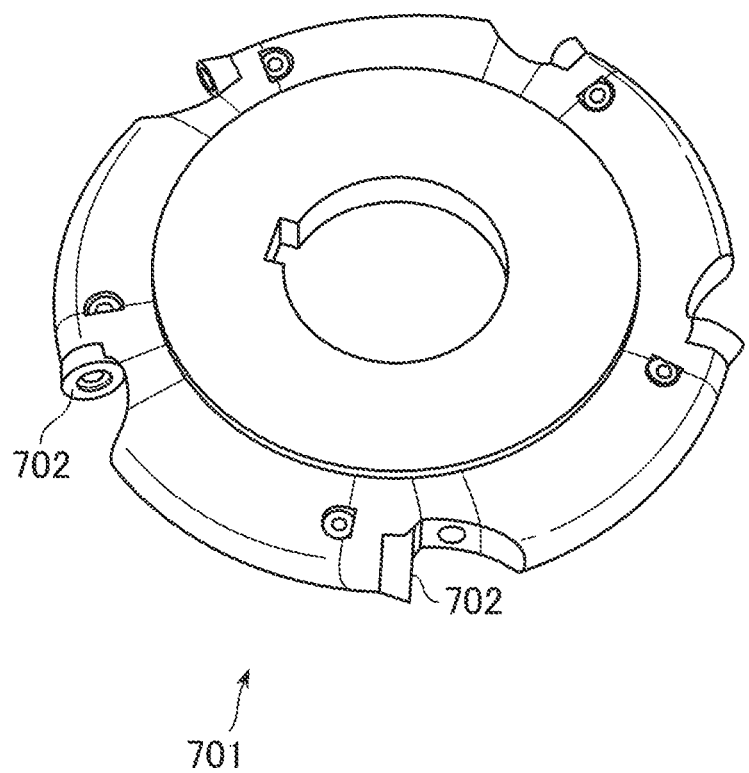
FIG. 7A is a view illustrating an example of a side cutter in the second embodiment.
Figure 7B:
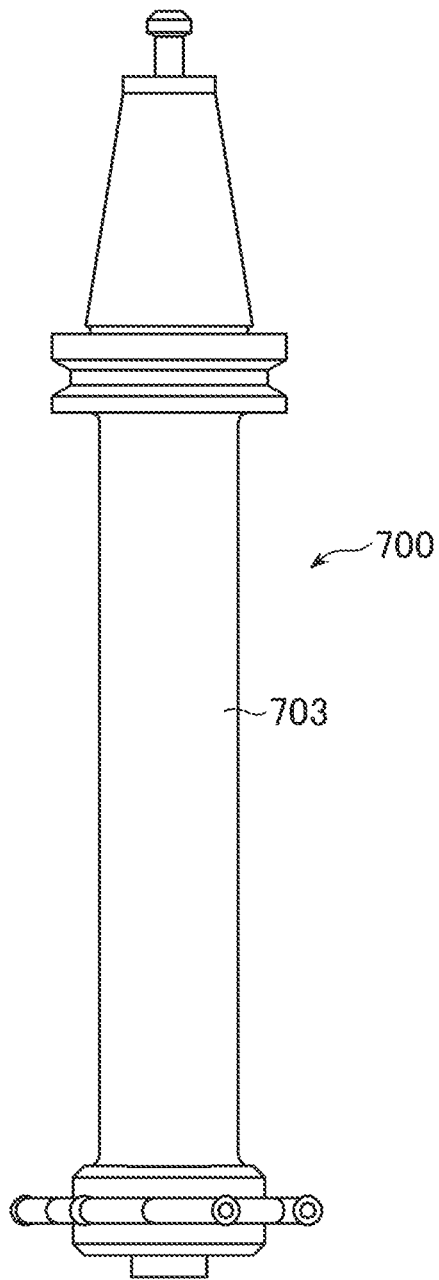
FIG. 7B is a view illustrating the example of the side cutter in the second embodiment.

In this case, for example, as illustrated in FIG. 7A, the side cutter 700 has a plurality of cutting edges 702 on an outer circumference of a circular cutter cutting section 701. Further, the cutter cutting section 701 uses an arbor 703, on which the cutter cutting section 701 is to be mounted, having a predetermined length and a predetermined diameter so as not to interfere with the material 201 during cutting. Note that, the cutting edges 702 may be mounted so as to be replaceable.

Next, the material 201 is cut by relatively moving the cutting section 701 of the side cutter 700 along the inner side surface 204 of the target elbow 200 in a direction from the second end surface 205 to the first end surface 203 (second cutting). In this case, this embodiment is different from the above-mentioned embodiment in that the side cutter 700 is used instead of the ball end mill 100. The other points are the same as those of the above-mentioned embodiment, and hence the descriptions thereof are omitted.

According to this embodiment, a method of manufacturing an elbow with higher speed and higher accuracy without causing uncut portions, and an elbow can be provided in the same way as in the above-mentioned embodiment. For example, in the related art, the side cutter is moved in a spiral shape along the inner side surface of the target elbow so as to cut in a side surface direction of the cutter. However, in this embodiment, the elbow 200 can be manufactured at higher speed by cutting along the inner side surface 204 of the elbow 200 along the target inner side surface 204.

Further, for example, in the above-mentioned related art, a pitch for spiral movement is varied when the inner side surface 204 of the target elbow is formed by moving the side cutter in a spiral shape, and hence the flatness is different between the inner side and the outer side of the inner side surface 204 with respect to the bending angle of the elbow 200. However, according to this embodiment, the flatness can be rendered substantially the same on the entire inner side surface 204 so that the flatness in the surface on the inner side of the curvature of the elbow 200 is not different from that in the surface on the outer side of the curvature of the elbow 200 by performing the first and second cuttings along the target inner side surface 204.

Third Embodiment

This embodiment is different from the first embodiment mainly in that the size of a cutting section 101 including a plurality of ridge portions 103 and cutting edges 104 is equal to the inner diameter of a target elbow 200. Note that, in the following, the descriptions of the same points as those of the first embodiment are omitted.

First, an example of a rotary cutting tool to be used in a method of manufacturing the elbow 200 in this embodiment is described. In the same way as in the first embodiment, as illustrated in FIG. 1, a ball end mill 100 in this embodiment includes a spherical cutting section 101 and a shaft section 102 formed so as to extend from the cutting section 101. However, in this embodiment, the size of the cutting section 101 including the plurality of ridges 103 and cutting edges 104 is the same as the inner diameter of the target elbow 200. Note that, for example, the number of the ridge portions 103 and the number of the cutting edges 104 may be varied depending on the difference in the size.

Next, a method of manufacturing the elbow 200 in this embodiment is described. In this embodiment, in the same way as in the first embodiment, a material 201 is set on a table of a machining device (not shown). Then, the ball end mill 100 is set so that the shaft section 102 of the ball end mill 100 is substantially perpendicular to a first end surface 203 of the material 201.

Next, the material 201 is cut by relatively moving the cutting section 101 of the ball end mill 100 along an inner side surface 204 of the target elbow 200 in a direction from the first end surface 203 to a second end surface 205 of the material 201 (first cutting). Then, the material 201 is cut by relatively moving the cutting section of the ball end mill 100 along the inner side surface 204 of the target elbow 200 in a direction from the second end surface 205 to the first end surface 203 (second cutting).

In this case, in the first embodiment, the size of the cutting section 101 is smaller than the inner diameter of the target elbow 200, as described above and hence only a part of the inner side surface 204 can be cut. However, in this embodiment, the size of the cutting section 101 is the same as the inner diameter of the target elbow as described above. Therefore, the entire surface of a cross section of the inner side surface 204 from the first end surface 203 side can be cut during one first cutting and second cutting. That is, in the first and second cuttings, the inner side surface 204 from the first end surface 203 side can be finished.

Next, in the same way as in the first embodiment, the ball end mill 100 is set so that the shaft section 102 of the ball end mill 100 is substantially perpendicular to the second end surface 205. Specifically, for example, the table is rotated so that the shaft section 102 of the ball end mill 100 is set so as to be substantially perpendicular to the second end surface 205. Next, the first cutting and the second cutting are carried out in the same way as in the foregoing.

In this case, in the same way as in the foregoing, in this embodiment, the size of the cutting section 101 is equal to the inner diameter of the target elbow, and hence the entire surface of a cross section of the inner side surface 204 from the second end surface 205 side can be cut during one first cutting and second cutting. That is, in the first and second cuttings, the inner side surface 204 from the second end surface 205 side can be finished.

Next, an outer side surface 206 of the target elbow 200 is formed. Thus, the target elbow 200 is formed.

According to this embodiment, the entire inner side surface 204 from the first end surface 203 side can be cut during one first cutting and second cutting, and similarly, the entire inner side surface 204 from the second end surface 205 side can be cut during one first cutting and second cutting. Thus, the manufacturing time of the target elbow 200 can be further greatly shortened. Note that, in the foregoing, the case where the first and second cuttings from the second end surface 205 side are carried out has been described. However, for example, in the case where the entire inner side surface 204 of the elbow 200 can be formed by cutting from the first end surface 203 side, such as the case where the bending angle of the elbow 200 is small, the first and second cuttings from the second end surface 205 side can be omitted. In this case, the manufacturing time can be further shortened.

Further, unlike the first embodiment, it is not necessary to move the ball end mill 100 in the direction of the circular inner side surface of the elbow 200 during the first cutting and the second cutting, and hence the complication of the movement control of the ball end mill 100 and the complication of a machining device can also be avoided.

According to this embodiment, a method of manufacturing an elbow with higher speed and higher accuracy without causing uncut portions, and an elbow can be provided in the same way as in the above-mentioned first and second embodiments. Further, the flatness can be substantially the same on the entire inner side surface 204 so that the flatness is not different between the surface on an inner side of the curvature of the elbow 200 and the surface on an outer side of the curvature of the elbow 200.

The present invention may be modified variously without being limited to the first to third embodiments. For example, the present invention may be replaced by a configuration which is substantially the same as those of the first to third embodiments, a configuration having an action and effect which are substantially the same as those of the first to third embodiments, or a configuration capable of achieving the same object as those of the first to third embodiments.

Figure 8A:
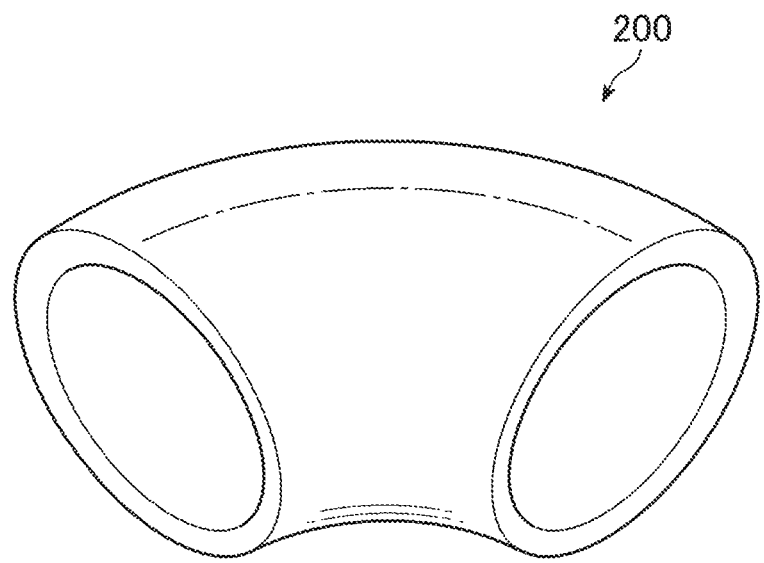
FIG. 8A is a view illustrating another example of the elbow in the first or second embodiment.
Figure 8B:
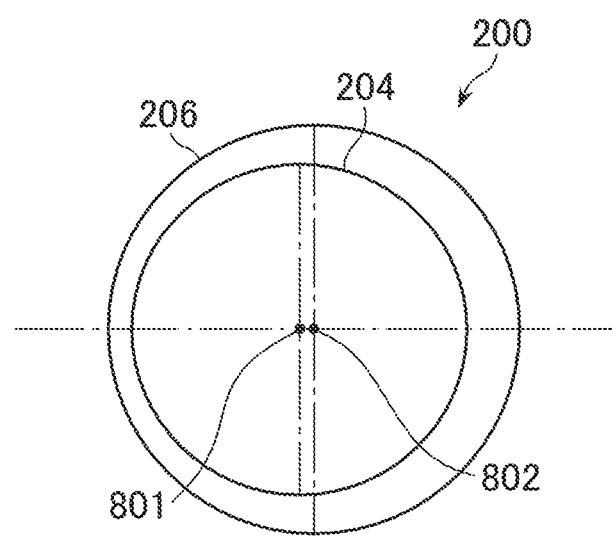
FIG. 8B is a view illustrating another example of the elbow in the first or second embodiment.

For example, in the first to third embodiments, mainly an elbow having a bending angle of 90° has been described. However, another bending angle, for example, 180° may be used. Further, for example, in the first to third embodiments, as an example, the method of manufacturing the elbow 200 having a predetermined tube thickness has been described. However, for example, as illustrated in FIGS. 8A and 8B, a center 801 of the inner side surface 204 of the elbow 200 may be shifted with respect to a center 802 of the outer side surface 206. In this case, for example, in the case where the tube thickness of the elbow 200 on an outer side of the bending angle of the elbow 200 is set to be larger than the tube thickness on an inner side, the strength on the outer side of the bending angle of the elbow 200 can be rendered higher than that on the inner side.

Figure 9:
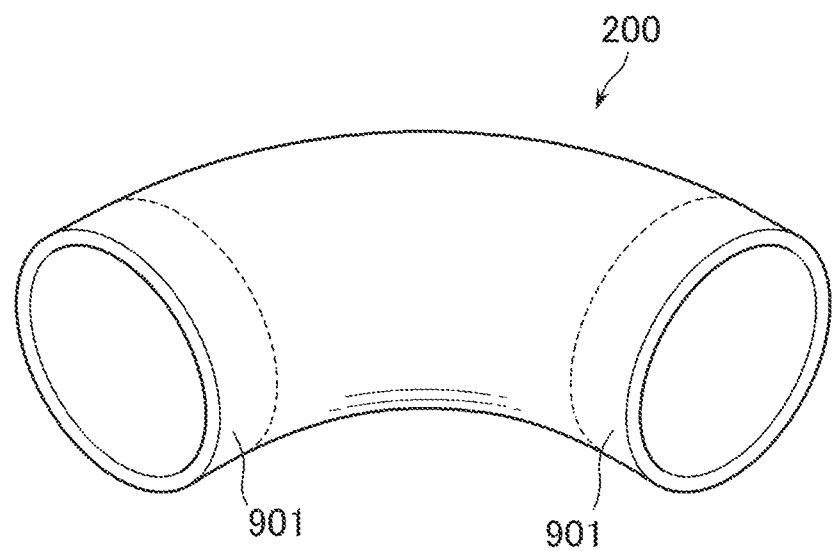
FIG. 9 is a view illustrating another example of the elbow in the first or second embodiment.
Figure 10:
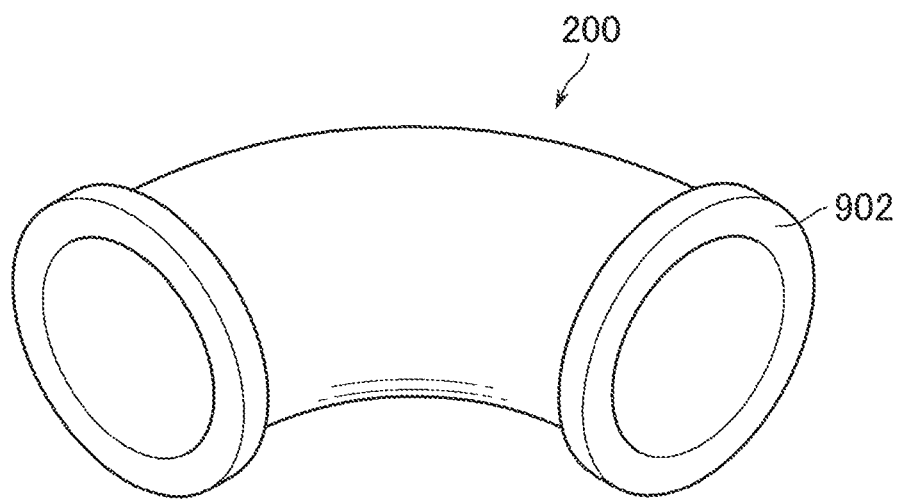
FIG. 10 is a view illustrating another example of the elbow in the first or second embodiment.

Further, regarding the shape of the elbow 200, for example, as illustrated in FIG. 9, each of the first and second end surfaces 203, 205 of the elbow 200 may have a linear portion 901 having a linear shape, or one of the first and second end surfaces 203, 205 may have the linear portion 901. Further, as illustrated in FIG. 10, each of the first and second end surfaces 203, 205 of the elbow 200 may have a flange 902 integrally.

Further, the first to third embodiments may also be used for forming an inner side surface of an elbow or a bent pipe, the inner cross section of which does not keep a perfectly circular shape, into a perfectly circular shape.

Figure 11:
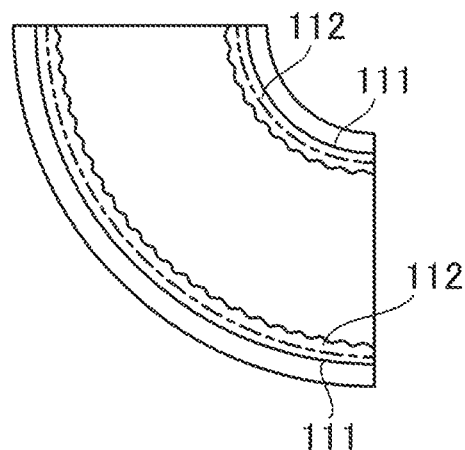
FIG. 11 is a view illustrating the case to be used for forming a cross section of an inner side surface of an elbow or a bent pipe, the inner cross section of which does not keep a perfectly circular shape, into a perfectly circular shape.

For example, in the elbow 200 or a bent pipe, the inner cross section of which does not keep a perfectly circular shape, as illustrated in FIG. 11, uncut portions and allowable portions for the deformation during a bending step (hereinafter referred to as "uncut portions 112") are present, compared to the dimension (finished dimension 111) of an ideal inner side surface.

Figure 12:
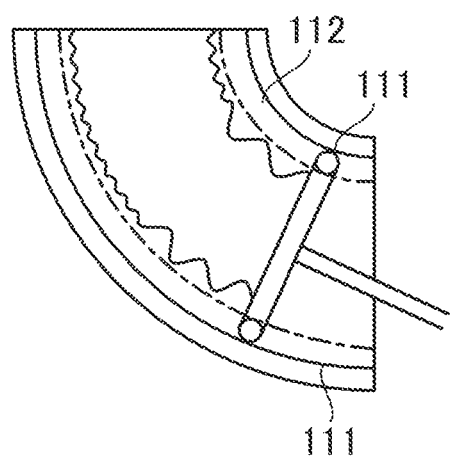
FIG. 12 is a view illustrating the case to be used for forming a cross section of an inner side surface of an elbow or a bent pipe, the inner cross section of which does not keep a perfectly circular shape, into a perfectly circular shape.

In this case, in the case where the uncut portions 112 have a predetermined thickness or more with respect to the ideal side surface (finished dimension 111), for example, in the case of using the cutting section 701 in a disk shape as described above, the cutting edges 702 are generally small, and hence the range to be cut is limited, with the result that the cross section of the elbow or bent pipe cannot have a perfectly circular shape. Specifically, for example, as illustrated in FIG. 11, when the uncut portions 112 are thick, in the case of cutting through use of the disk-shaped cutting section 701 having a diameter smaller than an inner diameter of an elbow from an inner side of the uncut portions 112, cutting can be carried out up to a portion indicated by an alternate long and short dash line on an inner side of the uncut portions 112, but cutting cannot be carried out up to the finished dimension 111. Further, for example, as illustrated in FIG. 12, in the case of using the disk-shaped cutting section 701 having a diameter equal to that of the inner side of the elbow, the range to be cut is limited to the range of the alternate long and short dash line of FIG. 12 depending on the size of the cutting edges 702. Accordingly, in the case where the uncut portions 112 have a thickness larger than that indicated by the alternate long and short dash line, the uncut potions 112 cannot be removed.

However, cutting can be carried out up to the finished dimension 111 by using the ball end mill 101 having the spherical cutting section 101 as in the first or third embodiment.

As described above, the first and third embodiments may also be used for forming an inner side surface of an elbow or a bent pipe, the inner cross section of which does not keep a perfectly circular shape, into a perfectly circular shape. Note that, the elbow in the claims also includes, for example, the above-mentioned elbow and bent pipe.

Fourth Embodiment

Next, a fourth embodiment of the present invention is described. This embodiment is different from the first embodiment in the shape of the cutting section 101. This embodiment is different from the first embodiment in that the diameter of a substantially spherical portion of the cutting section 101 is equal to the inner diameter of an elbow to be finished, and the inner side surface of the elbow to be finished is formed mainly by relatively moving the cutting section in a direction from a first end surface to a second end surface of a roughly formed elbow 150. Note that, in the following, the descriptions of the same portions as those of the first to third embodiments are omitted. Note that, in this embodiment, for example, the roughly formed elbow 150 is used as a material 201. In this case, the roughly formed elbow 150 corresponds to, for example, an elbow or the like in which the cross section on an inner side of the above-mentioned elbow does not keep a perfectly circular shape.

First, an example of a cutting tool 131 to be used in a method of manufacturing an elbow in this embodiment is described.

Figure 13A:
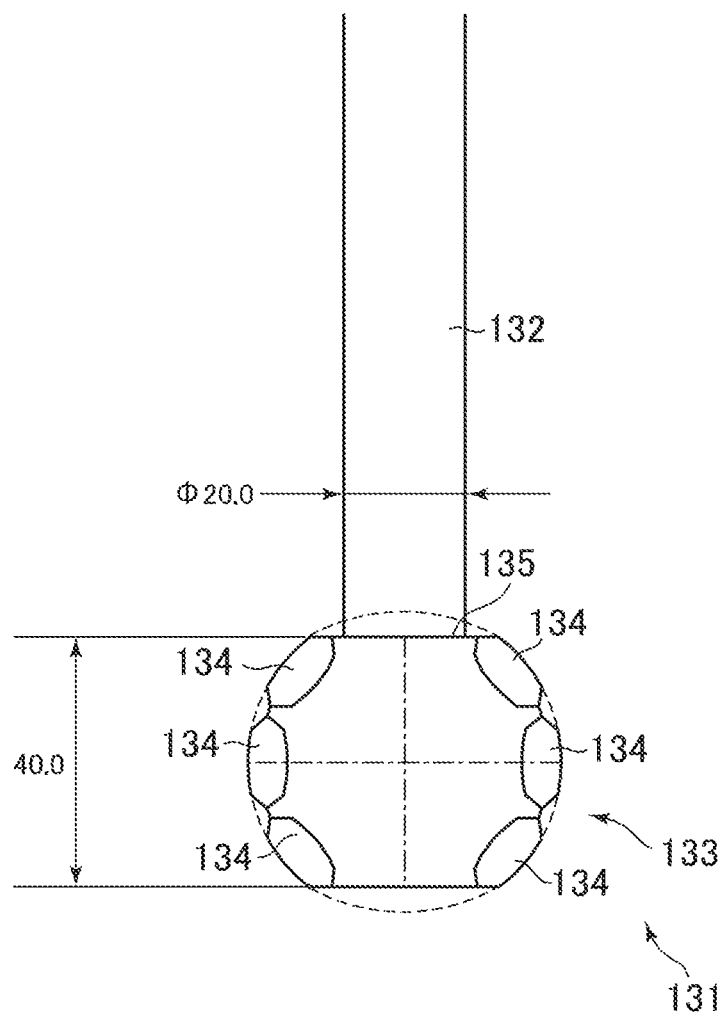
FIG. 13A is a view illustrating an example of a cutting tool in a third embodiment of the present invention.
Figure 13B:
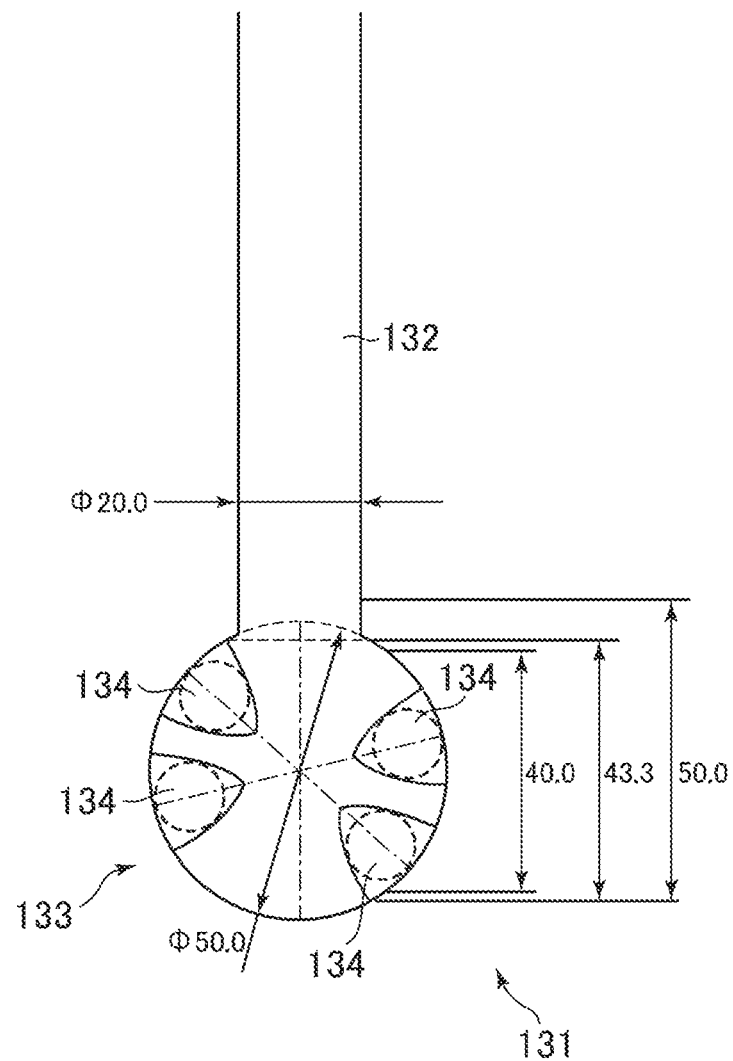
FIG. 13B is a view illustrating another example of the cutting tool in the third embodiment.

FIGS. 13A and 13B are views illustrating an example of a cutting tool in this embodiment. Specifically, FIGS. 13A and 13B are views illustrating an example of a schematic structure of the cutting tool 131 to be used in a method of manufacturing a so-called 90° elbow having a bending angle of 90°.

As illustrated in FIG. 13A, the cutting tool 131 in this embodiment includes a shaft section 132 and a cutting section 133. The cutting section 133 is formed of at least a part of a substantially spherical shape and includes a plurality of cutting edges 134.

Specifically, for example, as illustrated in FIG. 13A, the cutting section 133 includes a portion obtained by cutting away a part of a substantially spherical shape in a region connected to the shaft section 132 and a region positioned on an opposite side of the shaft section 132. More specifically, for example, the ratio to the diameter of the substantially spherical shape and the cut-away part is about 5:1. That is, for example, in the case where the diameter of the substantially spherical shape is 50, the length of the cutting section 133 formed of at least a part of the substantially spherical shape in a direction along the shaft section 132 is 40. Note that, in FIGS. 13A and 13B, the substantially spherical shape is indicated by a dotted line for ease of understanding.

Further, as illustrated in FIG. 13A, the cutting edges 134 are arranged in a part of the surface of the cutting section 133. Specifically, for example, 6 cutting edges 134 are arranged on the right side and the left side of FIG. 13A. Note that, the number and position of the cutting edges 134 are an example, and this embodiment is not limited thereto. For example, in the same way as in the first embodiment, the ridge portions 103 may be provided, and the plurality of cutting edges 134 may be provided on the side surface of each of the ridge portions 103.

The shaft section 132 is connected to a flat portion 135 which is a portion obtained by cutting away a part of the substantially spherical shape of the cutting section 133 as illustrated in FIG. 13A. The diameter of the shaft section 132 is about one-fifth to two-fifths as large as the diameter of the substantially spherical shape. Specifically, for example, the cross section of the shaft section 132 is, for example, a substantially circular shape, and in the case where the diameter of the substantially spherical shape is 50, the diameter of the substantially circular shape is set to 20.

FIG. 13B is a view illustrating another example of the cutting tool 131 in this embodiment. As illustrated in FIG. 13B, for example, the cutting section 133 of the cutting tool 131 has two cutting edges 134 on each of the right side and the left side of FIG. 13B. In this case, for example, the two cutting edges 134 disposed on the right side and the two cutting edges 134 disposed on the left side are arranged while being shifted from each other with respect to a direction along the shaft section 132. Thus, for example, a portion which cannot be cut with the two cutting edges 134 disposed on the right side is cut with the two cutting edges 134 disposed on the left side. Further, as illustrated in FIG. 13B, the distance from an end of the cutting edge 134 disposed on the left side on the shaft section 132 side to an end of the cutting edge 134 disposed on the right side on an opposite side to the shaft section 132 is set to 43.3, for example, in the case where the diameter of the substantially spherical shape of the cutting section 133 is set to 50. Note that, unlike FIG. 13A, the cut-away portion may not be provided on the opposite side to the shaft section 132 as illustrated in FIG. 13B.

Note that, although FIG. 13B illustrates the case where two cutting edges 134 are disposed on each of the right side and the left side of FIG. 13B, the number and position of the cutting edges 134 are merely an example. The other points are the same as those of the cutting tool 131 illustrated in FIG. 13A, and hence the descriptions thereof are omitted.

Figure 14:
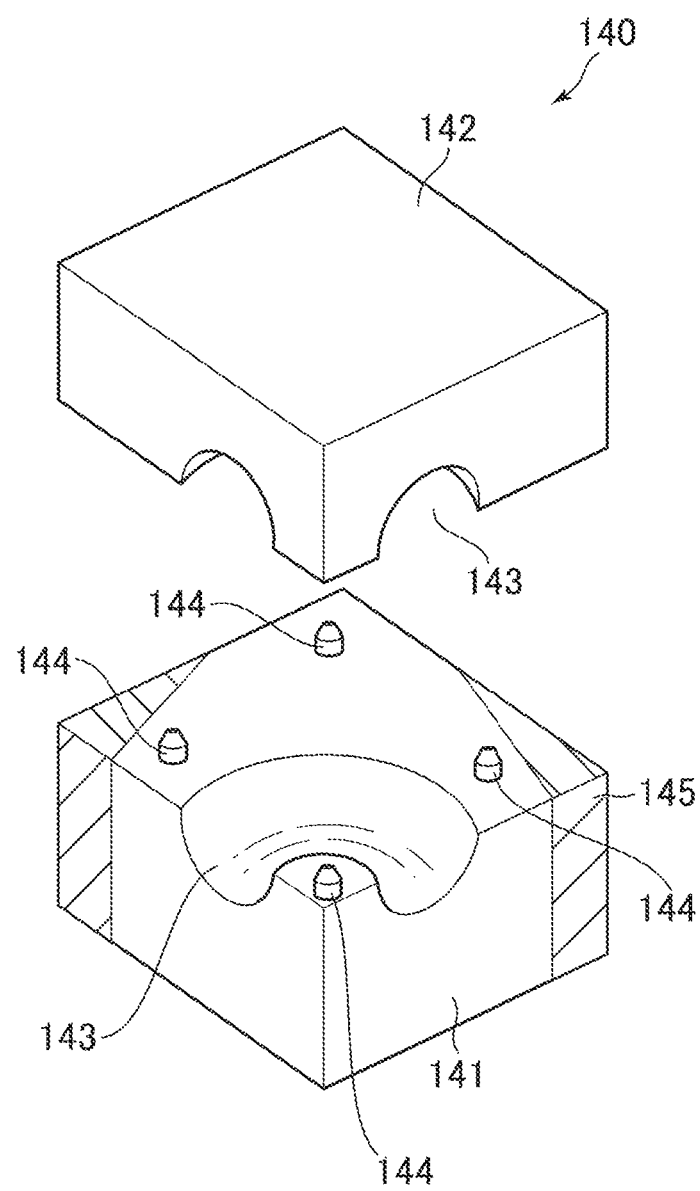
FIG. 14 is a view illustrating an example of a jig for the fixing of an elbow.
Figure 15A:
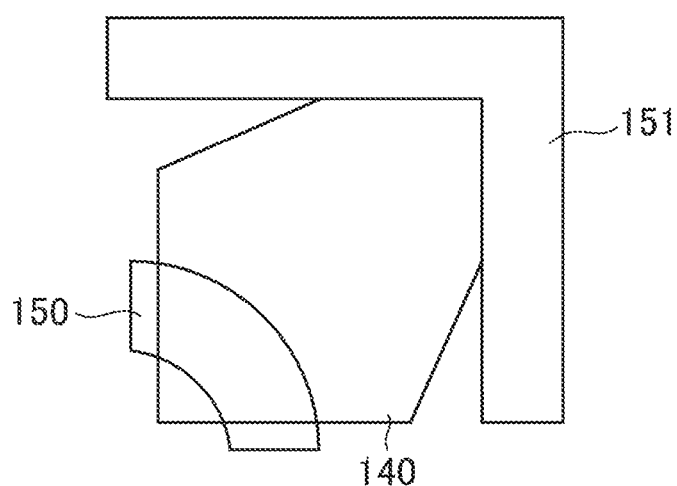
FIG. 15A is a view illustrating the fixing of an elbow to a table.
Figure 15B:
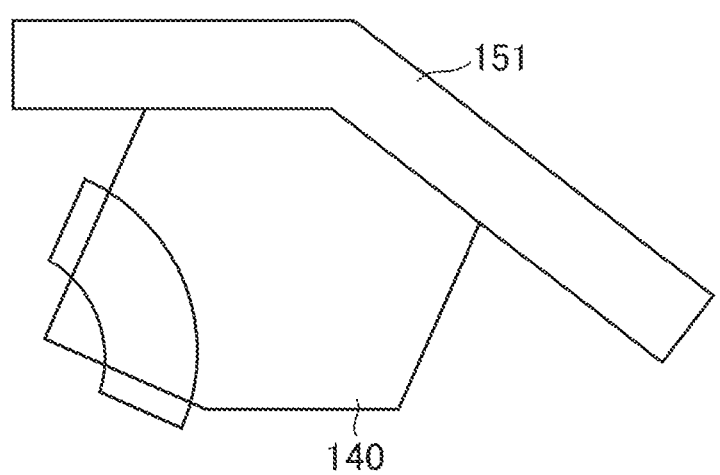
FIG. 15B is a view illustrating the fixing of an elbow to a table.

Next, a method of manufacturing a so-called 90° elbow having a bending angle of substantially 90° in this embodiment is described. First, the roughly formed elbow 150 as the material 201 is fixed to a table (not shown). In this case, for example, as illustrated in FIGS. 14, 15A, and 15B, the roughly formed elbow 150 is fixed to a jig 140. Then, the jig 140 having the roughly formed elbow 150 fixed thereto is disposed so as to come into contact with an abutment jig 151 disposed on the table. Thus, the roughly formed elbow 150 is fixed to the table.

Specifically, for example, as illustrated in FIG. 14, the jig 140 includes a body portion 141 and a presser portion 142. The body portion 141 has, for example, a rectangular shape as illustrated in FIG. 14 and includes a recess 143 along an outer shape of an upper half of the roughly formed elbow 150. Similarly, the presser portion 142 has, for example, a recess 143 along an outer shape of a lower half of the roughly formed elbow 150. Note that, for example, the recess 143 is designed so that both ends of the roughly formed elbow 150 partially extend off the recess 143 when the roughly formed elbow 150 is disposed on the recess 143 as illustrated in FIGS. 15A and 15B. Further, the recess 143 has a bending angle of substantially 90° in the same way as in the roughly formed elbow 150, and the jig 140 is disposed on the table so that an inner side of the bending angle is directed to the center of rotation of the table.

Further, the body portion 141 includes, for example, a plurality of protrusions 144 on an upper surface as illustrated in FIG. 14, and the presser portion 142 includes a plurality of insertion portions (not shown) into which the plurality of protrusions 144 are inserted. In this case, as illustrated in FIG. 14, the protrusion 144 includes a tapered portion whose width becomes narrow gradually toward the presser portion 142.

Further, as illustrated in FIG. 14, the jig 140 has a shape in which parts of the rectangular shape are cut away. Note that, in FIG. 14, the cut-away portions are indicated by diagonally shaded areas for ease of understanding.

The roughly formed elbow 150 is disposed in the recesses 143 formed in the body portion 141 and the presser portion 142 and pressed between the body portion 141 and the presser portion 142 to be fixed to the jig 140. For example, as illustrated in FIGS. 15A and 15B, the jig 140 having the roughly formed elbow 150 fixed thereto is fixed to the table by disposing two adjacent side surfaces of the jig 140 on the abutment jig 151 formed along an angle of the two adjacent side surfaces of the jig 140. Note that, FIGS. 15A and 15B illustrate an example of a plan view when viewed from an upper side of the table.

Figure 16A:
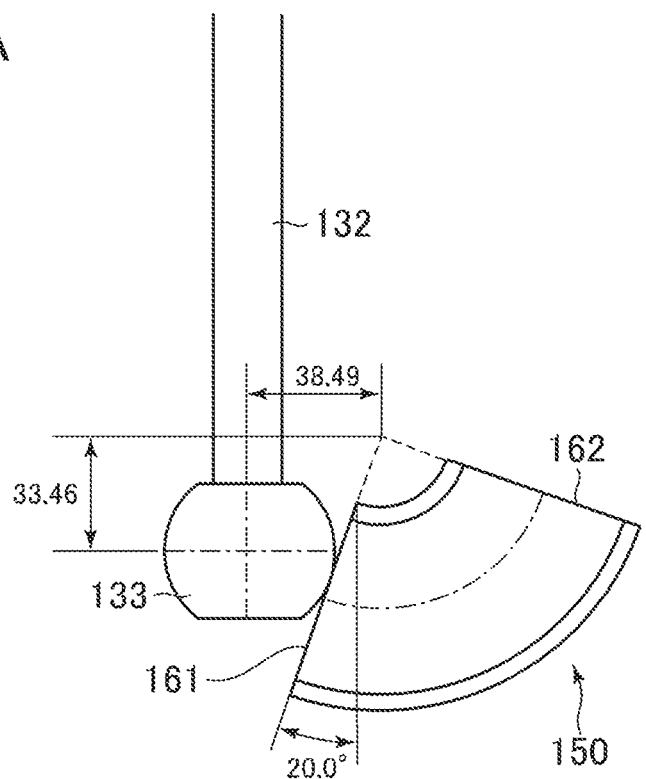
FIG. 16A is a view illustrating a method of manufacturing an elbow in the third embodiment.

As illustrated in FIG. 16A, the position of the cutting section 133 and/or the table is adjusted so that the cutting section 133 can start intruding into a first end surface 161 of the roughly formed elbow 150 at an angle of substantially 20° with respect to a direction along the shaft section 132 extending from the cutting section 133.

Then, the inner side surface of the roughly formed elbow 150 is cut to form an inner side surface of the elbow to be finished, for example, by rotating the table so that the center of the substantially spherical shape of the cutting section 133 relatively moves along a center line of the elbow to be finished.

More specifically, for example, as illustrated in FIG. 16A, the cutting section 133 starts intruding into the first end surface 161 of the roughly formed elbow 150 at an angle of substantially 20° with respect to a direction along the shaft section 132 extending from the cutting section 133. Then, the center of the substantially spherical shape of the cutting section 133 is moved relatively along the center line of the elbow to be finished by rotating the table.

Figure 16B:
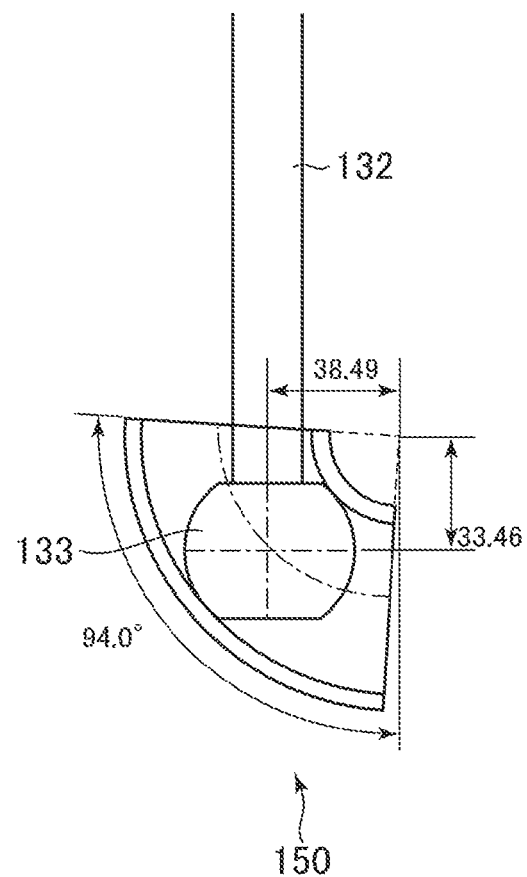
FIG. 16B is a view illustrating the method of manufacturing an elbow in the third embodiment.
Figure 16C:
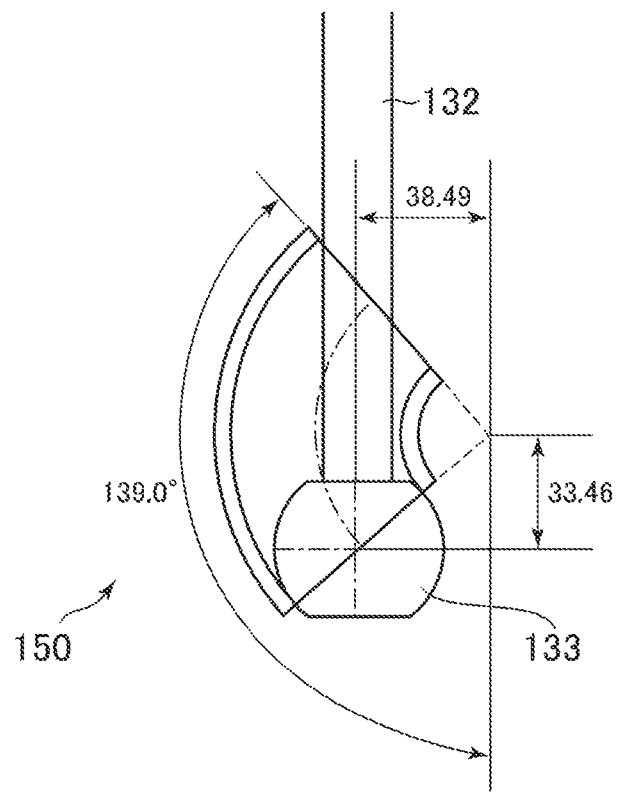
FIG. 16C is a view illustrating the method of manufacturing an elbow in the third embodiment.

In this case, FIG. 16B illustrates an example of a state in which the center of the substantially spherical shape of the cutting section 133 has moved to a half of the center line of the roughly formed elbow 150. Then, the inner side surface of the elbow to be finished is formed by further rotating the table. In this case, FIG. 16C illustrates an example of a positional relationship between the cutting section 133 and the roughly formed elbow 150 when the inner side surface of the elbow to be finished has been formed, that is, when the center of the substantially spherical shape of the cutting section 133 has reached a second end surface 162.

After that, the cutting section 133 is moved in an opposite direction to the foregoing, that is, the cutting section 133 is moved relatively from the second end surface 162 to the first end surface 161 by rotating the table in an opposite direction to the foregoing, with the result that the cutting section 133 stops intruding into the elbow to be finished in which the inner side surface has been finished.

Note that, the movement speed of the cutting section 133 from the second end surface 162 to the first end surface 161 may be set to be higher than that of the cutting section 133 from the first end surface 161 to the second side surface. In this case, the rotation speed of the shaft section 132 in the case of the movement from the second end surface 162 to the first end surface 161 may be set to be higher than that of the shaft section 132 in the case of the movement from the first end surface 161 to the second end surface 162.

Further, in the foregoing, the case where the table moves (rotates) has been mainly described. However, the cutting section 133 may be configured so as to move or both the table and the cutting section 133 may be moved. In other words, it is only required that the table and the cutting section 133 move relatively.

In this case, as is understood from FIGS. 16A to 16C, when the inner side surface of the elbow to be finished is formed, only a part of the cutting section 133 cuts the inner side surface of the roughly formed elbow 150. More specifically, the cutting section 133 positioned in a straight line connecting the center of the bending angle of the elbow to be finished to the center line of the substantially spherical shape of the cutting section 133 and the cutting edges 134 disposed in a region on the periphery of the cutting section 133 cut the side surface of the roughly formed elbow 150.

Thus, as illustrated in FIGS. 13A and 13B, the cutting section 133 provided with the cutting edges 134 only in a part of the substantially spherical shape of the cutting section 133 can be used. Note that, as described with reference to FIGS. 11 and 12, the roughly formed elbow 150 includes allowable portions for the bending step or the like in the manufacturing process of the elbow 150 in which the inner side surface is roughly formed. Therefore, it is preferred that the cutting edges 134 be provided also in a region on the periphery of the cutting section 133 positioned on a straight line connecting the center of the bending angle of the elbow to be finished to the center line of the substantially spherical shape of the cutting section 133. Note that, although the case of using the cutting tool 131 illustrated in FIG. 13A has been described as an example in FIGS. 16A to 16C, the cutting tool 131 illustrated in FIG. 13B may be used.

Further, as is understood from FIGS. 16A to 16C, according to this embodiment, the inner side surface of the elbow to be finished can be formed without causing the shaft section 132 to interfere with the inner side surface of the roughly formed elbow 150 through use of the cutting tool 131 including the cutting section 133 formed of a part of a substantially spherical shape as described above or the like in the manufacturing step of the elbow to be finished. Thus, the inner side surface of the elbow to be finished can be formed by one intrusion of the cutting section 133 from the first end surface 161 side.

Figure 17:
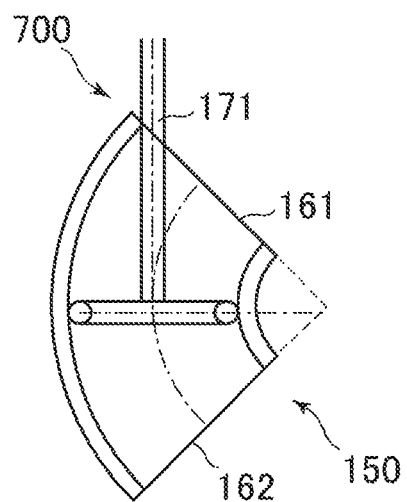
FIG. 17 is a view illustrating a comparative example with respect to the third embodiment.

In this case, FIG. 17 is a view illustrating a comparative example with respect to this embodiment. Specifically, FIG. 17 illustrates a state in which a side cutter having a diameter equal to that of the inner side surface of the elbow to be finished is moved from the first end surface 161 to the second end surface 162 in the same way as in FIGS. 16A to 16C.

As is understood from FIG. 17, even when the shaft section 132 of the side cutter is set to one-tenth as large as the inner diameter of the elbow, at a time when the cutting section 133 of the side cutter intrudes into the roughly formed elbow 150 at an angle of 45° from the first end surface 161, a shaft section 171 of the side cutter 700 interferes with the inner side surface of the roughly formed elbow 150. That is, according to the comparative example, unlike this embodiment, the inner side surface of the elbow to be finished cannot be formed only by the intrusion of the cutting section 133 from one end surface (for example, the first end surface 161) without causing the interference with the inner side surface of the roughly formed elbow 150. In contrast, according to this embodiment, as described above, the inner side surface of the elbow to be finished can be formed only by the intrusion of the cutting section 133 from one end surface (for example, the first end surface 161).

According to this embodiment, the 90° elbow whose inner cross section has a perfectly circular shape can be manufactured in a shorter period of time. Further, in the case of using the cutting section 133 illustrated in FIG. 13B in this embodiment, the number of the cutting edges 134 can be reduced more.

Note that, the foregoing is an example, and this embodiment can be modified variously without being limited to the foregoing. For example, in the foregoing, the method of manufacturing a 90° elbow has been described mainly. However, this embodiment may be used for manufacturing an elbow whose inner side surface has a perfectly circular shape, having other bending angles such as 45° and 180°. Note that, in the case of manufacturing the elbow having, for example, a bending angle of 90° or more, cutting may be carried out from the first end surface 161 side and the second end surface 162 side.

Further, the first end surface 161 or the second end surface 162, or both of them of the 90° elbow may have, for example, the linear portion 901 as illustrated in FIG. 9. In this case, the linear portion 901 is formed, for example, by cutting from the second end surface 162 side. Further, in this case, for example, when the cutting tool 131 having the cutting section 133 illustrated in FIG. 13A or 13B is used, the linear portion 901 can be formed by causing the cutting section 133 to intrude in a direction in which the shaft section 132 and the linear section 901 become substantially parallel to each other.

Further, in the foregoing, the method of manufacturing an elbow in which only the inner side surface of the roughly formed elbow 150 has a perfectly circular shape has been described. However, the outer side surface (outer shape) may further have a perfectly circular shape. An outer shape processing tool in this case is described below.

Figure 18:
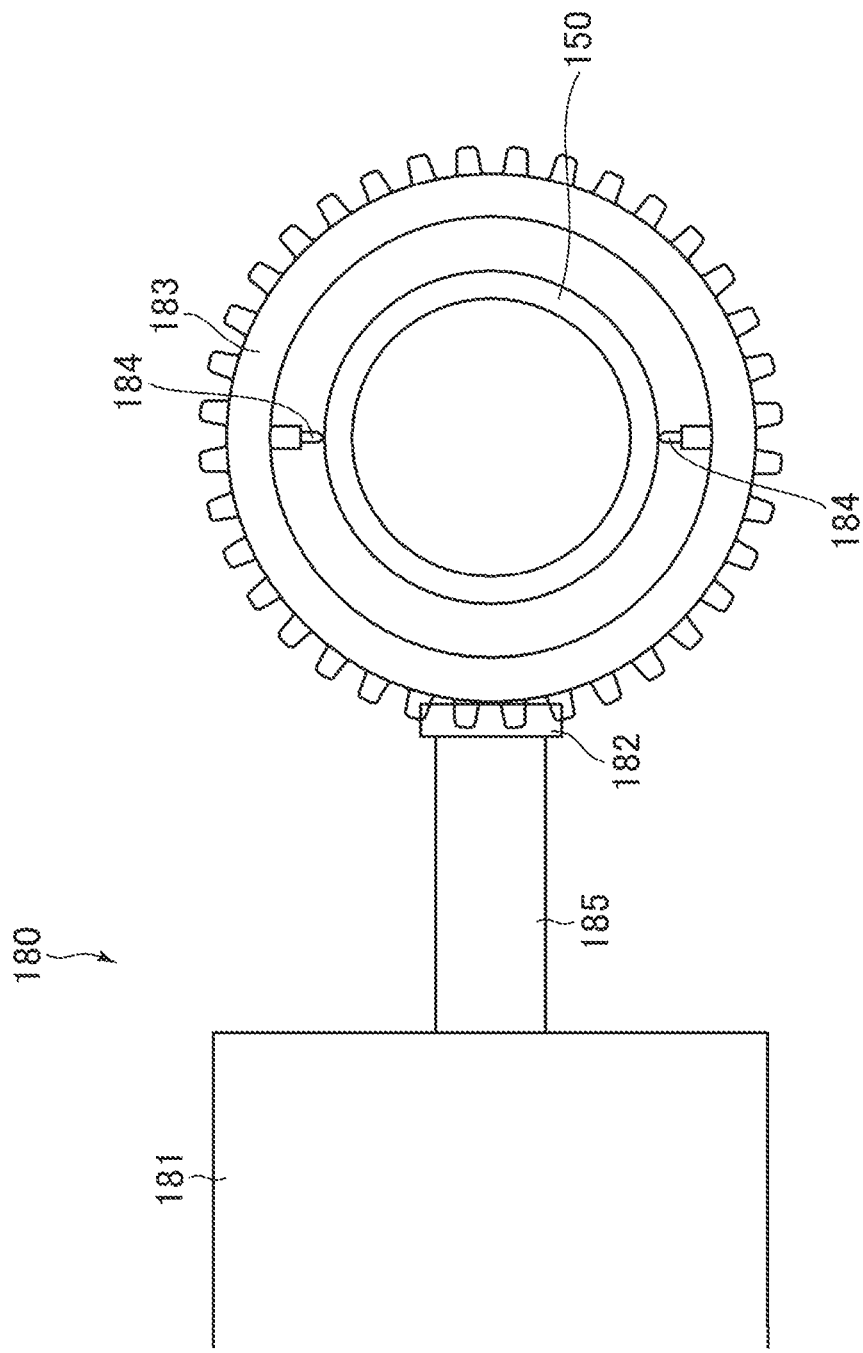
FIG. 18 is a view illustrating an outer shape processing tool.

FIG. 18 is a view illustrating an outer shape processing tool. As illustrated in FIG. 18, an outer shape processing tool 180 includes a motor 181, a first gear 182, a second gear 183, and a processing tip 184.

Specifically, for example, the rotation of the motor 181 is transmitted to the first gear 182 through a shaft 185 or the like, and further the rotation of the first gear 182 is transmitted to the second gear 183. In this case, the second gear 183 has teeth on an outer circumference and has a substantially circular shape in which an opening area is formed, when viewed from a cross section. Further, one or a plurality of processing tips 184 are provided on a part of an inner circumference of the second gear 183.

Then, the outer side surface of the elbow to be finished is formed by passing the roughly formed elbow 150 through the opening area. Specifically, for example, the roughly formed elbow 150 is fixed to a table through use of an elbow fixing portion 190 described later and passed through the opening area while the outer side surface of the elbow to be finished is being formed by rotating the table. FIGS. 19A to 19D illustrate a state in this case.

Next, an example of the elbow fixing portion 190 is described. The elbow fixing portion 190 includes, for example, an elbow insertion portion 191 formed so as to have a shape along the inner side surface of the roughly formed elbow 150 and into which the roughly formed elbow 150 is inserted, and a wide-width portion 192 which extends from the elbow insertion portion 191 and which is formed so as to have a diameter larger than that of the elbow insertion portion 191 and smaller than that of the outer side surface of the roughly formed elbow 150. Note that, the roughly formed elbow 150 corresponds to an elbow in which the inner side surface of the elbow to be finished has already been formed, for example, in the case where the inner side surface is formed in advance.

Figure 19A:
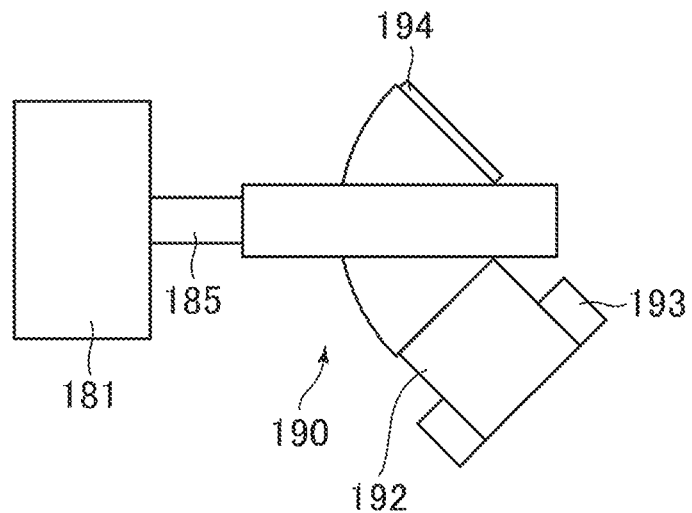
FIG. 19A is a view illustrating the formation of an outer side surface of the elbow.
Figure 19B:
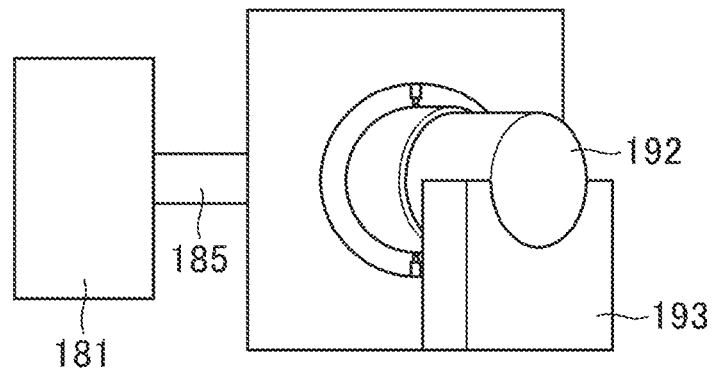
FIG. 19B is a view illustrating the formation of the outer side surface of the elbow.
Figure 19C:
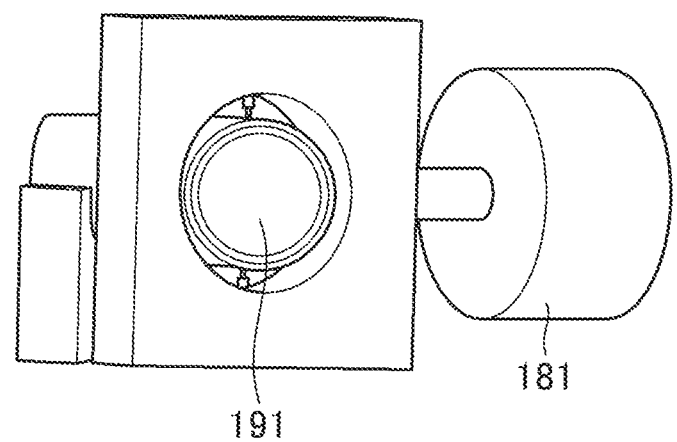
FIG. 19C is a view illustrating the formation of the outer side surface of the elbow.
Figure 19D:
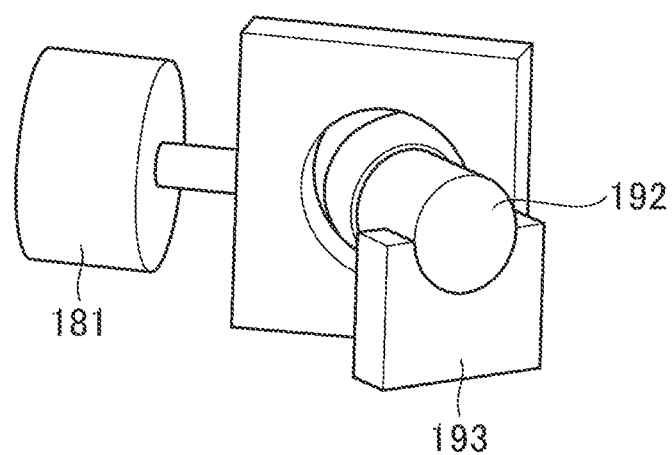
FIG. 19D is a view illustrating the formation of the outer side surface of the elbow.

As illustrated in FIG. 19A, the wide-width portion 192 has a substantially cylindrical shape, and the wide-width portion 192 is fixed to the table through intermediation of a table fixing portion 193. Further, the elbow insertion portion 191 includes a fixing portion 194 which can be mounted in a freely removable manner on an opposite side to the wide-width portion 192.

The fixing portion 194 is formed, for example, so that an inner circumference thereof is provided along an outer circumference of the elbow insertion portion 191 and a diameter thereof is formed smaller than that of the outer side surface of the roughly formed elbow 150. Further, screw portions (not shown) which are engaged with each other are formed on the outer circumference of the elbow insertion portion 191 and the outer circumference of the fixing portion 194. After the elbow is inserted into the elbow insertion portion 191, the fixing portion 194 is fixed to the elbow insertion portion 191 through the screw portions, with the result that the elbow is fixed to the elbow insertion portion 191. In other words, for example, the fixing portion 194 and the elbow insertion portion 191 correspond to a relationship of a nut and a bolt.

Note that, the elbow fixing portion 190 is an example, and the shape and the like of the elbow fixing portion 190 are not limited to the foregoing. The elbow fixing portion 190 may have other shapes and the like as long as the elbow fixing portion 190 does not interfere with the processing tip 184 when the outer side surface of the roughly formed elbow 150 is formed. Note that, FIGS. 19A to 19D each illustrate a state in which the first gear 182, the second gear 183, and the like in FIG. 18 are accommodated in a housing.

Fifth Embodiment

Next, a fifth embodiment of the present invention is described. This embodiment is different from the fourth embodiment mainly in the shape of a shaft section 221 of a cutting tool 220. Further, this embodiment is different from the fourth embodiment mainly in that the bending angle of an elbow to be finished is substantially 180°. Note that, in the following, the descriptions of the same points as those of the fourth embodiment and the like are omitted.

First, an example of the cutting tool 220 to be used in a method of manufacturing an elbow in this embodiment is described. FIG. 20 is a view illustrating the cutting tool in this embodiment. As illustrated in FIG. 20, for example, the cutting tool 220 mainly includes a cutting section 133, the shaft section 221 extending from the cutting section 133, a first shaft portion 222, a second shaft portion 223, and a tubular portion 230 covering the shaft section 221, the first shaft portion 222, and the second shaft portion 223. Further, the cutting tool 220 includes a chuck portion 224 for fixing the shaft section 221.

In the cutting section 133, the diameter of a substantially spherical portion is equal to the inner diameter of a 180° elbow to be finished. Note that, the detail of the cutting section 133 is the same as that of the fourth embodiment, and hence the description thereof is omitted.

The shaft section 221 includes the cutting section 133 at one end and a first bevel gear at the other end. Further, the first shaft portion 222 includes a second bevel gear 226 which is engaged with the first bevel gear 225 at one end, and a third bevel gear 227 which is engaged with the fourth bevel gear 228 at the other end. Further, the second shaft portion 223 includes a fourth bevel gear 228 which is engaged with the third bevel gear 227 at one end.

Note that, the second shaft portion 223 is rotated, for example, with the motor 181 through a plurality of gears (not shown). Note that, needless to say, the cutting section 133 is rotated when the above-mentioned rotation is transmitted to the cutting section 133 through the second shaft portion 223 and the like.

Further, as illustrated in FIG. 20, one or a plurality of bearings 229 are provided respectively on the outer circumferences of the shaft section 221, the first shaft portion 222, and the second shaft portion 223. Thus, the shaft section 221, the first shaft portion 222, and the second shaft portion 223 are fixed in a rotatable manner at predetermined positions in the tubular portion 230.

The shaft section 221 and the first shaft portion 222 are arranged so as to have an angle of, for example, substantially 45°, and the second shaft portion 223 and the third shaft portion are arranged so as to have an angle of substantially 45°. Further, the diameter of the tubular portion 230 is set to, for example, two-fifths or less as large as the diameter of the substantially spherical shape of the cutting section 133. Note that, FIG. 20 illustrates, as an example, the case where the diameter of the tubular portion 230 is 20 when the diameter of the substantially spherical shape of the cutting section 133 is set to 50.

Next, a method of manufacturing a so-called 180° elbow having a bending angle of 180° in this embodiment is described. Note that, in the following, the descriptions of the same points as those in the fourth embodiment are omitted.

Figure 21A:
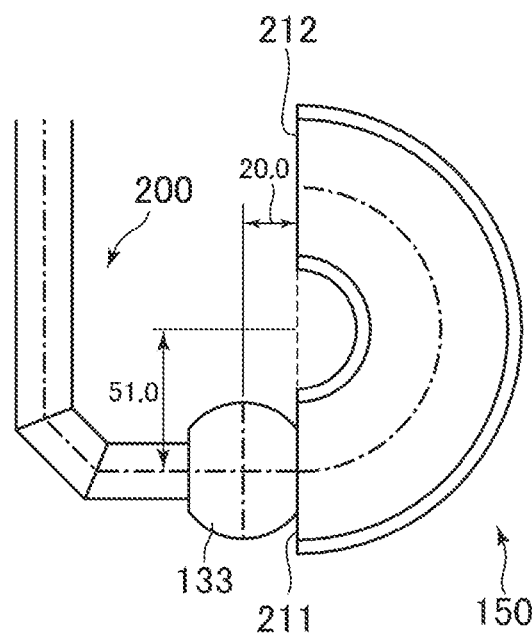
FIG. 21A is a view illustrating a method of manufacturing an elbow in the third embodiment.

First, as illustrated in FIG. 21A, the cutting section 133 starts intrusion so that the shaft section 221 is directed perpendicularly to a first end surface 211 of the roughly formed 180° elbow. In this case, the cutting section 133 starts intrusion so that the center of the substantially spherical shape of the cutting section 133 passes along the center line of the 180° elbow to be finished.

Figure 21B:
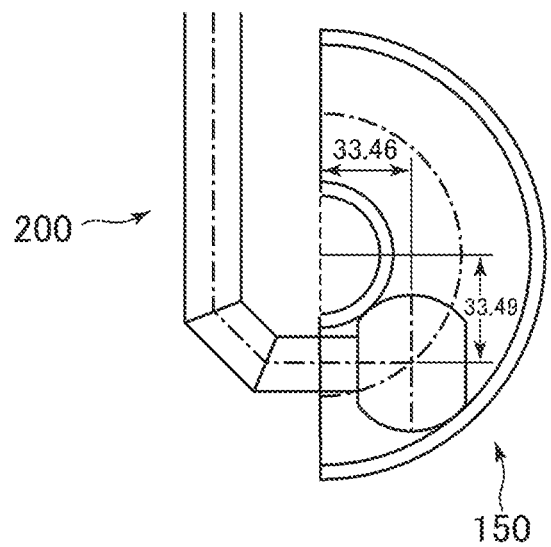
FIG. 21B is a view illustrating the method of manufacturing an elbow in the third embodiment.
Figure 21C:
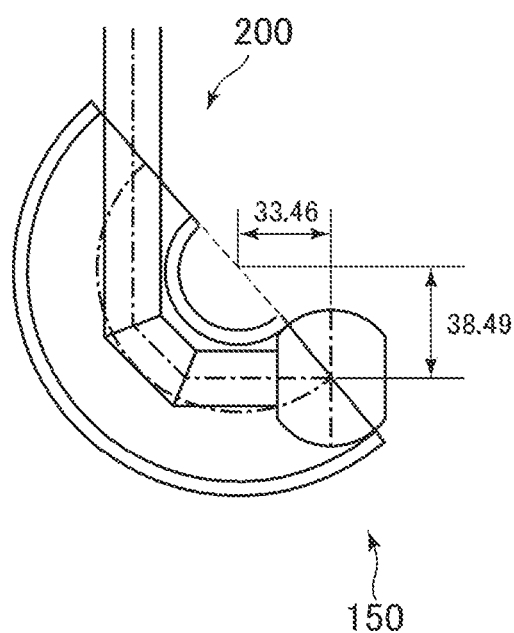
FIG. 21C is a view illustrating the method of manufacturing an elbow in the third embodiment.

Next, the cutting section 133 is relatively moved so that the center of the substantially spherical shape of the cutting section 133 passes along the center line of the 180° elbow to be finished. FIG. 21B illustrates a state during the movement, and FIG. 21C illustrates a state in which the movement of the cutting section 133 has reached a second end surface 212, and the inner side surface of the 180° elbow to be finished has been formed. After that, the intrusion of the cutting section 133 into the 180° elbow is finished by moving the cutting section 133 in an opposite direction to the foregoing.

As is understood from FIGS. 21A to 21C, the tubular portion 230 and the inner side surface of the roughly formed elbow 150 do not interfere with each other when the cutting section 133 is relatively moving with respect to the roughly formed elbow 150. Thus, the 180° elbow to be finished can be formed by causing the cutting section 133 to intrude from one end surface side (first end surface 211) of the roughly formed elbow 150. Thus, compared to the case where the inner side surface of the roughly formed elbow 150 is formed from both sides by causing the cutting section 133 to intrude from both end surfaces (first end surface 211 and second end surface 212), the manufacturing time of the 180° elbow can be greatly shortened.

Note that, in the foregoing, the case where the 180° elbow in which the inner side surface has a perfectly circular shape is formed from the roughly formed 180° elbow has been described. However, this embodiment may also be used for the case where the inner side surface of the roughly formed elbow 150 having other bending angles is formed into a perfectly circular shape. In this case, needless to say, it is necessary to appropriately adjust the number of the shaft portions of the cutting tool 200, the angle between the shaft portions, the shape and size of the tubular portion 230, and the like depending on the bending angle of the roughly formed elbow 150.

Further, in the same way as in the fourth embodiment, this embodiment can be modified variously without being limited to the foregoing. For example, in the same way as in the fourth embodiment, the outer side surface (outer shape) may be formed into a perfectly circular shape.

Note that, the present invention can be modified variously without being limited to the first to fifth embodiments. For example, the present invention may be replaced by a configuration which is substantially the same as those of the first to fifth embodiments, a configuration having the same action and effect as those of the first to fifth embodiments, or a configuration capable of achieving the same object as those of the first to fifth embodiments. For example, the dimension of each portion illustrated in FIGS. 13A, 13B, and 16A to 16C is an example, and the present invention is not limited thereto.

The invention claimed is:

1. A method of manufacturing an elbow, comprising:
   a cutting step of cutting a roughly formed elbow to form an inner side surface of the elbow to be finished by relatively moving a cutting section included in a cutting tool, which is formed of at least a part of a substantially spherical shape, along a center line of the elbow to be finished in a direction from a first end surface to a second end surface of the roughly formed elbow;
   a moving step of relatively moving the cutting section along the center line of the elbow to be finished in a direction from the second end surface to the first end surface of the roughly formed elbow; and
   an outer side surface formation step of forming an outer side surface of the elbow to be finished by carrying out cutting along an outer circumference of an outer side surface of the roughly formed elbow by relatively rotating a processing tip, and moving the roughly formed elbow in the direction from the first end surface to the second end surface,
   the cutting section having a diameter substantially equal to an inner diameter of the elbow to be finished,
   wherein the roughly formed elbow has a through-hole penetrating from the first end surface to the second end surface, and based on the cutting step, a first position of contact between the roughly formed elbow and the cutting section is separate from a second position of contact between the roughly formed elbow and the cutting section, in a direction along a shaft section extending from the cutting section.

2. The method of manufacturing an elbow according to claim 1, wherein a bending angle of the elbow to be finished is substantially 90°.

3. The method of manufacturing an elbow according to claim 2, wherein the cutting step comprises causing the cutting section to start intruding into the first end surface at an angle of substantially 20° with respect to a direction along a shaft section extending from the cutting section.

4. The method of manufacturing an elbow according to claim 1, further comprising a step of fixing the roughly formed elbow to a table,
   wherein the cutting step and the moving step are carried out by rotating the table.

5. The method of manufacturing an elbow according to claim 2, wherein the cutting tool comprises a shaft section extending from the cutting section, and a diameter of the shaft section is one-fifth to two-fifths as large as a diameter of the substantially spherical shape.

6. The method of manufacturing an elbow according to claim 1, wherein the cutting tool comprises a shaft section extending from the cutting section, and the cutting section comprises a plurality of cutting edges arranged while being shifted from each other with respect to a direction along the shaft section.

7. The method of manufacturing an elbow according to claim 1, further comprising a step of fixing the roughly formed elbow to a rotary table,
   wherein the moving the roughly formed elbow in the outer side surface formation step comprises rotating the rotary table.

8. The method of manufacturing an elbow according to claim 1, wherein based on the cutting step, the cutting section penetrates from the first end surface to the second end surface of the roughly formed elbow.

* * * * *